US012033531B2

(12) United States Patent
Marggraff et al.

(10) Patent No.: US 12,033,531 B2
(45) Date of Patent: Jul. 9, 2024

(54) SYSTEMS AND METHODS TO SELECT AN ACTION USING A HANDHELD DEVICE BY PERCEPTUAL ASSOCIATION

(71) Applicant: KINOO, Inc., Mountain View, CA (US)

(72) Inventors: Lewis James Marggraff, Lafayette, CA (US); Nelson George Publicover, Bellingham, WA (US)

(73) Assignee: Kibeam Learning, Inc., Oakland, CA (US)

( * ) Notice: Subject to any disclaimer, the term of this patent is extended or adjusted under 35 U.S.C. 154(b) by 0 days.

(21) Appl. No.: 17/944,103

(22) Filed: Sep. 13, 2022

(65) Prior Publication Data

US 2024/0036619 A1 Feb. 1, 2024

Related U.S. Application Data

(60) Provisional application No. 63/393,761, filed on Jul. 29, 2022.

(51) Int. Cl.
| G09B 5/04 | (2006.01) |
| G02B 27/20 | (2006.01) |
| G06F 1/16 | (2006.01) |
| G06F 3/01 | (2006.01) |
| G06F 3/0346 | (2013.01) |
| H04N 23/57 | (2023.01) |
| H04R 1/02 | (2006.01) |

(52) U.S. Cl.
CPC ............... *G09B 5/04* (2013.01); *G02B 27/20* (2013.01); *G06F 1/1694* (2013.01); *G06F 3/016* (2013.01); *G06F 3/017* (2013.01); *G06F 3/0346* (2013.01); *H04N 23/57* (2023.01); *H04R 1/028* (2013.01); *H04R 2499/11* (2013.01)

(58) Field of Classification Search
CPC ...... G06F 1/1694; G06F 3/017; G06F 3/0346; G06F 3/016; H04R 1/028; H04R 2499/11; H04R 25/00; H04R 2400/03; G09B 5/04; G02B 27/20; H04N 23/57
See application file for complete search history.

(56) References Cited

U.S. PATENT DOCUMENTS 9,128,661 B2 * 9/2015 Zilber ..................... A63F 13/22
9,446,319 B2 * 9/2016 Barney .................. A63F 13/25
(Continued)

*Primary Examiner* — Grant Sitta
(74) *Attorney, Agent, or Firm* — William A. English; Vista IP Law Group LLP

(57) ABSTRACT

Systems and methods are described in which a "one-of-N" selection may be produced based on one or more associations made by a human between a selected object from a group of "N" objects, and visual or acoustic cues produced by a handheld device. Objects may be comprised of real or virtual (i.e., displayed) objects in the environment of the handheld device user. Visual and/or acoustic cues may be generated by the handheld device under the control of the device user. Upon determining a perceived association between a cue and a selected object, the user may indicate a selection using one or more handheld device sensing elements such as a pushbutton, touch sensor, or inertial force measurement. Systems and methods may provide simple and intuitive methods to produce selected actions on the handheld device or on a connected device.

22 Claims, 8 Drawing Sheets

(56) References Cited

U.S. PATENT DOCUMENTS

| | | | | |
|---|---|---|---|---|
| 11,185,763 B2* | 11/2021 | Bradner | ................ | A63F 13/428 |
| 2008/0070682 A1* | 3/2008 | Woody | ................ | A63F 13/428 |
| | | | | 463/43 |
| 2018/0032144 A1* | 2/2018 | Horowitz | ................ | G06F 3/011 |

* cited by examiner

SYSTEMS AND METHODS TO SELECT AN ACTION USING A HANDHELD DEVICE BY PERCEPTUAL ASSOCIATION

RELATED APPLICATION DATA

The present application claims benefit of provisional application Ser. No. 63/393,761, filed Jul. 29, 2022, the entire disclosure of which is expressly incorporated by reference herein.

TECHNICAL FIELD

The present application relates generally to systems and methods for an individual to perform machine-based interactions using a handheld electronic device. Although the handheld device may be used by anyone, it may be particularly well-suited for use by a young child, utilizing simple interactive signalling that lacks requirements for precision manual dexterity and/or understanding complex interactive sequences. Systems and methods herein employ techniques within the fields of computer programming, electronic design, firmware design, inertial measurement units (IMUs), accelerometers, magnetometers, ergonometric construction, device controls, human motor control and human-machine interactions. Systems and methods may provide a user, especially a young child, with an intuitive machine interface to rapidly and/or instinctively interact within an environment composed of real and virtual objects.

BACKGROUND

In recent years, the world has become increasingly reliant on portable electronic devices that have become more powerful, sophisticated and useful to a wide range of users. However, although children may rapidly embrace using some aspects of electronics designed for more experienced users, young children may benefit from having access to interactive electronic devices that are small, light-weight, colorful, playful, informative, ergonomically designed for a child (including being child-safe), and easy to use. The systems and methods disclosed herein make use of recent advances in the fields of portable displays, sound generation on mobile devices using miniature coil speakers (or piezoelectric speakers and/or haptic units), inertial measurement units (sometimes also referred to as inertial motion units) and telecommunications.

Two-dimensional visual displays may be composed of any number of monochromatic or multi-colored, addressable light-sources or pixels. Displays may range from a single light source (e.g., illuminating an orb, transmitted via a waveguide), to those that are capable of displaying a single number (e.g., seven-segment display) or alphanumeric character (e.g., a five-pixel by eight-pixel array), to high-resolution screens with tens of millions of pixels. Regardless of scale, displays are typically implemented as: 1) a two-dimensional array of light sources (most frequently some form of light-emitting diodes (LEDs) including organic LEDs (OLEDs), or 2) two plates of polarized glass that sandwich liquid crystal material (i.e., forming a liquid crystal display, LCD) that responds to an electric current to allow different wavelengths of light from one or more illumination sources (i.e., a backlight) to pass.

Within handheld and/or mobile devices, the vibrations of a miniature speaker are generally produced using traditional (i.e., associated with larger speakers) electromagnetic moving coils or piezoelectric (sometimes referred to as "buzzer") designs. Vibrations (e.g., particularly those associated with a visual or acoustic alert) may also be generated by a haptic unit (also known as kinesthetic communication). Haptic units generally employ an eccentric (i.e., unbalanced) rotating mass or piezoelectric actuator to produce vibrations (particularly at the low end of the audio spectrum) that can be felt.

Inertial measurement unit (IMU), accelerometer and/or magnetometer tracking may incorporate any or all combinations of: 1) linear accelerometers measuring forces generated during movement (i.e., governed by Newton's second law of motion) in up to three axes or dimensions, 2) gyroscope-based sensing of rotational rates or velocities in up to three rotational axes, 3) magnetometers measuring magnetic field (i.e., magnetic dipole moment) including fields generated by the earth, and/or 4) the gravitational pull of the earth (including gravitational orientation) by measuring forces on an internal mass. The accuracy of IMUs, accelerometers and magnetometers varies widely, depending on size, operating range, compensating hardware that may be used for correction of measurements (affecting cost), environmental factors including thermal gradients, the availability of individual device calibrations, and times required to perform measurements (including integration times for some types of measurements).

Advances in both electronics (i.e., hardware), standardized communications protocols and allocation of dedicated frequencies within the electromagnetic spectrum have led to the development of a wide array of portable devices with abilities to wirelessly communicate with other, nearby devices as well as large-scale communications systems including the World Wide Web and the metaverse. Considerations for which protocols (or combinations of available protocols) to employ within such portable devices include power consumption, communication range (e.g., from a few centimeters to hundreds of meters and beyond), and available bandwidth.

Currently, Wi-Fi (e.g., based on the IEEE 802.11 family of standards) and Bluetooth (managed by the Bluetooth Special Interest Group) are used within many portable devices. Less common and/or older communications protocols within portable devices in household settings include Zigbee, Zwave, IR (infrared), and cellular- or mobile phone-based networks. In general (i.e., with many exceptions, particularly considering newer standards), compared with Bluetooth, Wi-Fi offers a greater range, greater bandwidth and a more direct pathway to the internet. On the other hand, Bluetooth, including Bluetooth Low Energy (BLE), offers lower power, a shorter operational range (that may be advantageous in some applications), and less complex circuitry to support communications.

Advances in miniaturization, reduced power consumption and increased sophistication of electronics, including those applied to displays, IMUs, micro electro-mechanical systems (MEMS) and telecommunications have revolutionized the mobile device industry. Such portable devices have become increasingly sophisticated, allowing users to concurrently communicate, interact, geolocate, monitor exercise, track health, be warned of hazards, capture videos, perform financial transactions, and so on. Systems and methods that facilitate simple and intuitive interactions with a handheld device, particularly for use by children, may be useful.

SUMMARY

In view of the foregoing, systems and methods are provided herein that describe a light-weight, simple-to-use and intuitive handheld device that may be particularly well-suited for machine-based interactions by a young child. Although the device may, in part, be accepted by a child as a toy, the computational flexibility embedded within the device may allow the device to be used as a means for play, embodied learning, emotional support, cognitive development, communications, expressing creativity, developing mindfulness, and enhancing imagination. Additionally, a portable, light-weight, "fun" handheld device may motivate physical movement by a child (and adults) including kinetic motions and kinesthetic activities.

According to one aspect, devices, systems, and methods are provided for a handheld device user to indicate perceived (i.e., by the user) associations or cognitive correlations between visual, acoustic and/or timing cues presented via the handheld device and real or virtual objects in the environment of the device user (i.e., perceived objects that are viewable, audible or sensed by any of the other human senses). Visual cues may be presented on one or more displays or other light sources (e.g., LEDs) on the handheld device. Similarly, acoustic cues may be produced by a speaker or other acoustic source (e.g., piezoelectric buzzer) on the handheld device. Timing cues may be produced by device display(s), speaker(s) and/or haptic stimulation. Indications of associations perceived by a device user may utilize one or more sensing elements of the handheld device. For example, an association may be indicated by operating a pushbutton, contact sensor, IMU (sensing movement, acceleration and/or orientation in a predefined direction, or of sufficient magnitude in any direction), camera or other visual sensor, microphone, biological sensor, or other input (i.e., with respect to the handheld device) component.

Presentation of visual, acoustic and/or timing cues to the device user on the handheld device may be controlled by the user via movements and/or orientations (i.e., in three-dimensional space) of the handheld device. As an example involving the use of visual cues, the sensed orientation of the handheld device relative to the gravitational pull of the earth (i.e., measured using an embedded IMU) may be used to control displayed colors (i.e., from a spectrum of colors) projected by the one or more handheld device displays. By moving the handheld device to different orientations (e.g., relative to the gravitational pull of the earth), the user may control generated colors and subsequently select (e.g., via a pushbutton) a color perceived as best matching a color of a selected object.

As a further example that makes use of auditory cues, a speaker within the handheld device may pronounce sounds associated with letters (e.g., "A", "B", "C", etc.) as the orientation of the handheld device is changed (i.e., analogous to controlling the hand of a clock, or a volume control knob). The sensed orientation of the handheld device relative to the magnetic pull of the earth (i.e., using an embedded magnetometer) may be used to control sound generation (i.e., from a library of sounds) broadcast by a handheld device speaker. Upon hearing an associated sound that best matches the selected object (e.g., an object name that starts with the selected letter), a user may indicate (e.g., via a pushbutton) the selected object.

As another example that makes use of associations based on timing and/or synchrony of presentations; visual, audible and/or haptic cues may be presented on the handheld device at various rates (e.g., adjusting intervals between presenting or changing cues) that are dependent on movements of the handheld device (i.e., sensed based on IMU data streams). When a user determines that the timing of cues presented by the handheld device approximately matches and/or is in synchrony with dynamic processes of a perceived object, then an indication may be made by the user of a perceived association with the selected object. As an example, if the wheels of virtual buses go "round and round", a particular bus may be chosen based on matching the timing and/or synchrony of wheel rotation with handheld device presentations. Selections based on the timing of movements or changes of perceived objects are particularly well suited when motion or changes are repetitive and/or accompanied by music or singing (e.g., providing a timing reference based on melody or beat).

Associations based on visual cues generated by the handheld device may entail a wide range of visual characteristics including color, color pattern(s), texture pattern(s), orientations of patterns or textures (e.g., relative to an aspect of the shape of the object), selected object shape, relative object size, a displayed name of the object, and so on. Similarly, associations based on acoustic cues generated by the handheld device may entail a range of acoustic qualities including a sound typically generated by the selected object, a sound typically associated with the selected object, an intensity (i.e., volume) of sound normally associated with the selected object, a phonetic sound associated with a name of the selected object, and so on. Associates may also be based upon the synchronization (e.g., in-phase or out-of-phase), sequencing (e.g., of a pattern of cues) or timing (e.g., repetition frequency) of audio and/or visual cues. Within further examples, associations may be made based on categories of objects (e.g., similar use or appearance), a mathematical relationship, a related object that is typically paired with a selected object (e.g., during use), and so on.

Objects may be real (e.g., stuffed toys, body parts, pots, pans, live butterflies, road signs) or virtual (e.g., displayed or projected). The selection process may be well-suited to a scenario of a young child associating objects shown on pages within a book, magazine, poster or sticker. The process does not necessarily require any form of pointing the handheld device toward any object or object selection indicator (e.g., menu). Along similar lines, the handheld device processor (or any other processor) may not require either an awareness of precise object locations (e.g., typically detected using a camera) under consideration by the device user or, for example, where any focus of attention might be on the part of the device user (e.g., via eye tracking and/or monitoring the perceptibility of particular sounds). The overall process may only require that a device user generates an indication of a perceived (i.e., cognitive) association or cognitive correlation between a visual, haptic and/or auditory cue or attribute produced by the handheld device and a selected object (i.e., from a group of objects) in the environment of the user.

Different designs and/or manufacturers of IMUs may optionally include one or more magnetometers within core IMU modules. Modern, chip-based measurements of force including those produced by gyroscopes, accelerometers, an internal mass and/or magnetometers typically employ MEMS techniques; however, in some cases, magnetometer-based measurements in particular may be implemented within separate modules (e.g., with their own electronic interface) or within subsystem modules (e.g., electronically slaved) to a primary IMU module. Along similar lines, force measurements in different dimensions (e.g., generally about orthogonal axes) may be implemented using separate electronic modules, for example, affixed to device arms where (e.g., compared with medial locations) forces in one or more directions may be greater. Within descriptions herein, IMU data refer to any combinations of measuring forces in one or more axes generated by one or more accelerometers, gyroscopes, internal masses (e.g., sensing gravity) and/or magnetometers (i.e., even if implemented within two or more distinct electronic modules).

In accordance with an example, a method is provided for a human to select an action using a handheld device related to two or more perceived objects in proximity to the human, each of the two or more perceived objects having at least one distinctive visual attribute, the method comprising: providing a handheld device operated by the human that includes a device processor, at least one device display operatively coupled to the device processor, at least one inertial measurement unit operatively coupled to the device processor, and at least one selection sensor operatively coupled to the device processor; acquiring, by the device processor from the at least one inertial measurement unit, one or more of accelerometer data, gyroscope data, gravitational orientation data and magnetic orientation data; displaying a displayed visual attribute on the at least one device display that is dependent on one or more of the accelerometer data, the gyroscope data, the gravitational orientation data and the magnetic orientation data; acquiring, by the device processor from the at least one selection sensor, an indication by the human that the displayed visual attribute is perceived by the human to associate with a selected object of the two or more perceived objects; and performing the action, by one or both of the device processor and a remotely connected processor, based at least in part on one or both of the selected object and an indication time of the indication by the human.

In accordance with another example, a method is provided for a human to select an action using a handheld device related to two or more perceived objects in proximity to the human, each of the two or more perceived objects having at least one distinctive acoustic attribute, the method comprising: providing a handheld device operated by the human that includes a device processor, at least one speaker operatively coupled to the device processor, at least one inertial measurement unit operatively coupled to the device processor, and at least one selection sensor operatively coupled to the device processor; acquiring, by the device processor from the at least one inertial measurement unit, one or more of accelerometer data, gyroscope data, gravitational orientation data and magnetic orientation data; broadcasting an acoustic attribute on the at least one speaker that is dependent on one or more of the accelerometer data, the gyroscope data, the gravitational orientation data and the magnetic orientation data; acquiring, by the device processor from the at least one selection sensor, an indication by the human that the acoustic attribute is perceived by the human to associate with a selected object of the two or more perceived objects; and performing the action on one or both of the device processor and a remotely connected processor, based at least in part on one or both of the selected object and an indication time of the indication by the human.

In accordance with yet another example, a method is provided for a human to select an action using a handheld device related to two or more perceived objects in proximity to the human, each of the two or more perceived objects having at least one distinctive visual attribute, the method comprising: providing a handheld device operated by the human that includes a device processor, at least one device display operatively coupled to the device processor, and at least one inertial measurement unit operatively coupled to the device processor; acquiring, by the device processor from the at least one inertial measurement unit, one or more of control accelerometer data, control gyroscope data, control gravitational orientation data and control magnetic orientation data; displaying a displayed visual attribute on the at least one device display that is dependent on one or more of the control accelerometer data, the control gyroscope data, the control gravitational orientation data and the control magnetic orientation data; acquiring, by the device processor from the at least one inertial measurement unit, one or more of selection accelerometer data, selection gyroscope data, selection gravitational orientation data and selection magnetic orientation data; determining by the device processor from one or more of the selection accelerometer data, the selection gyroscope data, the selection gravitational orientation data and the selection magnetic orientation data more, one of a tap on the handheld device by the human and a gesture movement of the handheld device by the human, indicating that the displayed visual attribute is perceived by the human to associate with a selected object of the two or more perceived objects; and performing the action on one or both of the device processor and a remotely connected processor, based at least in part on one or both of the selected object and an indication time of determining the selected object by the human.

In accordance with a further example, a method is provided for a human to select an action using a handheld device related to two or more perceived objects in proximity to the human, each of the two or more perceived objects having at least one distinctive acoustic attribute, the method comprising: providing a handheld device operated by the human that includes a device processor, at least one speaker operatively coupled to the device processor, and at least one inertial measurement unit operatively coupled to the device processor; acquiring, by the device processor from the at least one inertial measurement unit, one or more of accelerometer data, gyroscope data, gravitational orientation data and magnetic orientation data; broadcasting an acoustic attribute on the at least one speaker that is dependent on one or more of the accelerometer data, the gyroscope data, the gravitational orientation data and the magnetic orientation data; acquiring, by the device processor from the at least one inertial measurement unit, one or more of selection accelerometer data, selection gyroscope data, selection gravitational orientation data and selection magnetic orientation data; determining by the device processor from one or more of the selection accelerometer data, the selection gyroscope data, the selection gravitational orientation data and the selection magnetic orientation data more, one of a tap on the handheld device by the human and a gesture movement of the handheld device by the human, indicating that the acoustic attribute is perceived by the human to associate with a selected object of the two or more perceived objects; and performing the action on one or both of the device processor and a remotely connected processor, based at least in part on one or both of the selected object and an indication time of determining the selected object by the human.

In accordance with another example, a method is provided for a human to select an action using a handheld device related to two or more perceived objects in proximity to the human, at least one of the two or more perceived objects having at least one changing attribute, the method comprising: providing a handheld device operated by the human that includes a device processor, at least one device haptic unit operatively coupled to the device processor, at least one inertial measurement unit operatively coupled to the device processor, and at least one selection sensor operatively coupled to the device processor; acquiring, by the device processor from the at least one inertial measurement unit, one or more of accelerometer data, gyroscope data, gravitational orientation data and magnetic orientation data; producing tactile stimulations of the human by the at least one haptic unit at a stimulation rate that is dependent on one or more of the accelerometer data, the gyroscope data, the gravitational orientation data and the magnetic orientation data; acquiring, by the device processor from the at least one selection sensor, an indication by the human that the stimulation rate is perceived by the human to associate with one or both of being synchronized with the changing attribute and being at a similar frequency of the at least one changing attribute of a selected object of the two or more perceived objects; and performing the action, by one or both of the device processor and a remotely connected processor, based at least in part on one or both of the selected object and an indication time of the indication by the human.

In accordance with a further example, a method is provided for a human to select an action using a handheld device related to two or more perceived objects in proximity to the human, at least one of the two or more perceived objects having at least one changing attribute, the method comprising: providing a handheld device operated by the human that includes a device processor, at least one device display operatively coupled to the device processor, at least one inertial measurement unit operatively coupled to the device processor, and at least one selection sensor operatively coupled to the device processor; acquiring, by the device processor from the at least one inertial measurement unit, one or more of accelerometer data, gyroscope data, gravitational orientation data and magnetic orientation data; displaying visual attributes on the at least one device display at a display rate that is dependent on one or more of the accelerometer data, the gyroscope data, the gravitational orientation data and the magnetic orientation data; acquiring, by the device processor from the at least one selection sensor, an indication by the human that the display rate is perceived by the human to associate with one or both of being synchronized with the changing attribute and being at a similar frequency of the at least one changing attribute of a selected object of the two or more perceived objects; and performing the action, by one or both of the device processor and a remotely connected processor, based at least in part on one or both of the selected object and an indication time of the indication by the human.

In accordance with yet a further example, a method is provided for a human to select an action using a handheld device related to two or more perceived objects in proximity to the human, at least one of the two or more perceived objects having at least one changing attribute, the method comprising: providing a handheld device operated by the human that includes a device processor, at least one speaker operatively coupled to the device processor, at least one inertial measurement unit operatively coupled to the device processor, and at least one selection sensor operatively coupled to the device processor; acquiring, by the device processor from the at least one inertial measurement unit, one or more of accelerometer data, gyroscope data, gravitational orientation data and magnetic orientation data; broadcasting sounds on the at least one speaker at an acoustic rate that is dependent on one or more of the accelerometer data, the gyroscope data, the gravitational orientation data and the magnetic orientation data; acquiring, by the device processor from the at least one selection sensor, an indication by the human that the acoustic rate is perceived by the human to associate with one or both of being synchronized with the changing attribute and being at a similar frequency of the at least one changing attribute of a selected object of the two or more perceived objects; and performing the action on one or both of the device processor and a remotely connected processor, based at least in part on one or both of the selected object and an indication time of the indication by the human.

Other aspects and features including the need for and use of the present invention will become apparent from consideration of the following description taken in conjunction with the accompanying drawings.

BRIEF DESCRIPTION OF THE DRAWINGS

A more complete understanding may be derived by referring to the Detailed Description when considered in connection with the following illustrative figures. In the figures, like-reference numbers refer to like-elements or acts throughout the figures. Presented examples are illustrated in the accompanying drawings, in which.

DETAILED DESCRIPTION

Figure 1:
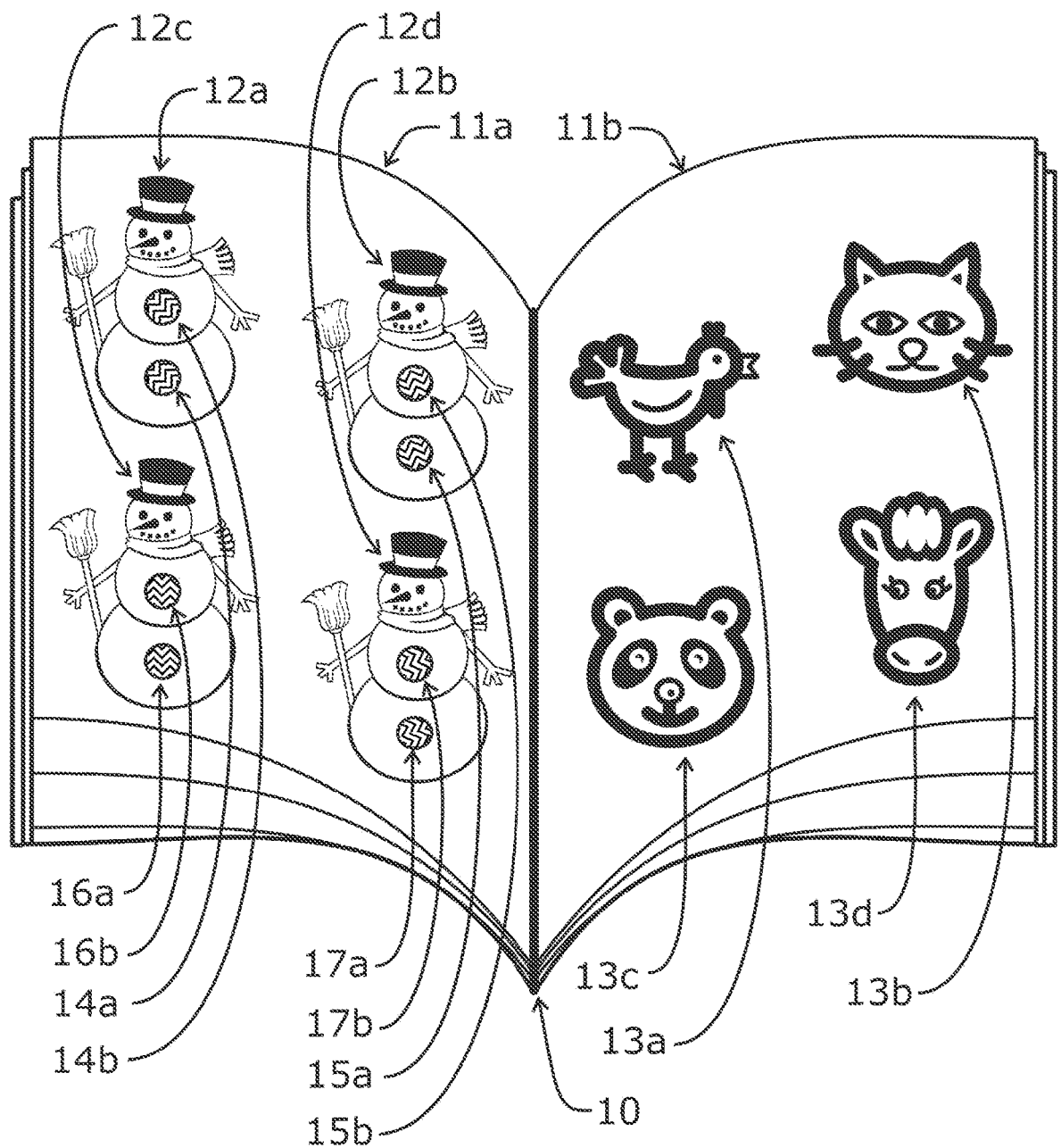
FIG. 1 shows two pages within a book, each page containing objects with distinctive attributes (e.g., the orientation of a zigzag pattern on the buttons of the four snowmen and different categories of animals) that allow selection of any individual object by a human via perceived association(s) with cues or attributes generated using a handheld device.

Before the examples are described, it is to be understood that the invention is not limited to particular examples described herein, as such may, of course, vary. It is also to be understood that the terminology used herein is for the purpose of describing particular examples only, and is not intended to be limiting, since the scope of the present invention will be limited only by the appended claims.

Unless defined otherwise, all technical and scientific terms used herein have the same meaning as commonly understood by one of ordinary skill in the art. It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

According to one aspect herein, devices, systems, and methods are provided for a user of a handheld device to specify or indicate (i.e., "select") an object (i.e., a "selected object") from a number (i.e., "N", where N is two or more) of real and/or virtual objects that are perceived (i.e., viewable, audible, and/or or sensed by any of the other human senses) by the user, based on one or more associations perceived by the user between one or more visual, timing, synchronization and/or acoustic cues or attributes presented on the handheld device and the selected object. One result of this process is making a so-called "one-of-N" selection (i.e., decision), where N is the total number of objects that are under consideration by the user at any given time.

The one-of-N selection may then be used by one or more processors to initiate or modulate one or more actions (i.e., "selected actions") or activities on the handheld device itself, and/or to transmit the one-of-N selection to a separate electronic device that, in turn, may initiate or modulate actions or activities on that device. To initiate or modulate actions on a remote device, the handheld device may include one or more telecommunications modules (e.g., Wi-Fi, Bluetooth) configured to communicate between the device processor and one or more remotely connected processors. Additionally, the time the selection was made by the handheld device user may be a component of initiating or modulating actions on handheld and/or remote electronic devices.

Objects may be real (e.g., toys, appliances, pets) or virtual (e.g., object displayed on a display screen, shown on a mobile device, printed object within a book, drawn object within a magazine, object projected by a projection device including a holographic projector, virtual reality headset or augmented reality glasses). The selection process may not require pointing any device (or finger, eyes or other body part) toward any object or menu. In addition, object locations do not need to be known by any machinery. One or more handheld device sensing elements (e.g., pushbutton, contact sensor, IMU, camera, microphone) may be used to indicate an association perceived by the device user. Processes that use handheld device sensing elements to indicate a selection are described in more detail, below.

As introduced in the Background and Summary sections above, IMU data streams may include of one or more of:
1. up to three channels (i.e., representing three orthogonal spatial dimensions typically denoted X, Y and Z) of accelerometer data,
2. up to three channels (i.e., representing rotation around 3 axes often denoted pitch, roll and yaw) of gyroscope rotational velocities,
3. up to three channels (i.e., representing orientation in three orthogonal dimensions) of magnetometer data representing magnetic forces (e.g., including the magnetic pull of the earth), and
4. up to three channels (i.e., representing orientation in three orthogonal dimensions) of inertial forces on an internal mass data that may include the gravitational pull of the earth.

Optionally, each of the IMU data streams may be expressed as time-varying vectors in up to three spatial dimensions using, for example, Cartesian, polar and/or spherical coordinate systems.

The selection process includes generating and presenting visual and/or acoustic cues or attributes on the handheld device during manipulations of the device by the user, sensed within one or more IMU data streams. Manipulations may include translational motion, rotation and/or orientation of the device relative to the magnetic and/or gravitational pull of the earth. IMU-dependent visual cues may be presented on one or more device displays or light sources (e.g., LEDs). Alternatively, or in addition, IMU-dependent acoustic cues may be produced by a speaker or other acoustic means (e.g., piezoelectric source) within the handheld device.

Conversion of analog IMU data into a digital form, suitable for processing, may use analog-to-digital (A/D) conversion techniques, well-known in the art. IMU sample rates may generally be in a range from about 100 samples/second to about 10,000 samples/second where (as introduced in the Background section, above) higher IMU sample rates involve trade-offs involving signal noise, cost, power consumption and/or circuit complexity. IMU-dependent control of visual and/or acoustic cues may require sample rates in the lower end of the range just described whereas, as described further below, determining the presence of a tap-based selection indication (e.g., using a finger to tap the handheld device or tapping the handheld device against a solid surface) and particularly determining the location of such a tap on the body of the handheld device generally requires sample rates in the upper end of the range just described.

Control of the presentation of visual and/or acoustic cues by the device user allows the user to manage rates of presenting new cues, how long an individual cue is presented (or re-presented), and/or the fidelity a user may desire in making an association with particular cues (e.g., how closely colors, sounds and/or patterns match while making comparisons). Device orientation data may also be used to express movements of the handheld device relative to previous movements of the device (e.g., when sensing sequential rotation of the device similar to turning a traditional knob), and/or motions relative to other objects in the environment of the device user (e.g., a reference object on a viewable display screen).

Associations based on visual cues generated by the handheld device may entail a range of visual characteristics including color, color pattern(s), texture pattern(s), orientations of patterns or textures, object shape, object size, display of a name or description of the object, and so on. Similarly, associations based on audible cues generated by the handheld device may entail a range of acoustic qualities including a sound typically generated by the selected object, a sound typically associated with the selected object, phonetic sound associated with a name of the selected object, enunciating one or more letters within the name of the object, and so on. Associations may also be made based on object categories (e.g., similar operation, function, product and/or appearance), mathematical relations, a related object that is typically paired with a selected object (e.g., during use), and so on.

Considering cognitive abilities to make such associations in more detail, the ability of humans to associate visual cues or attributes with objects is foundational to survival. The ability to recognize visual scenes and objects within long term memory generally exhibits a massive storage capacity and (unlike shorter term memory) requires little maintenance for retention. Efforts to train machines to associate images of objects with similar objects and/or object classifications has led to an appreciation of the power of visual association in humans. Damage to the area of the occipital and temporal lobes within the visual association cortex does not hinder an ability for a person to see objects, but removes the ability to recognize them as something meaningful.

A wide range of visual properties or attributes enables one to both distinguish an individual object as well as to cognitively group or cluster objects into different classifications or categories. These attributes include an object's color, combination of colors, texture, patterns (including patterns that themselves repeat), shape and/or size. Most of these attributes may be combined with orientation (e.g., relative to one or more edges, axes or surfaces of an object; or to references in the environment of the device user, such as a floor or wall) including the orientation(s) of a color pattern, object component, texture or shape.

Visual cues may also include one or more words and/or other descriptors that may distinguish or point to a selected object (or a distinctive component of a selected object). For example, displaying a "C" may be sufficient, based on the first character of words that describe a group of objects, to isolate a "cat" among the group of objects that begin with different letters. Along similar lines, displaying the word "red" may be sufficient to identify a selected object among a group of differently colored objects.

Within further examples, perceived associations between a sound generated by the handheld device and a specific object in the environment of the user may involve a range of cognitive processes. In general, sound associations mature early during childhood development. Within a world of (real and virtual) objects constantly producing sounds, distinctions within sounds produced by specific objects (e.g., rattle, squeaky toy, cat) are readily learned at a young age. Some of the earliest abilities to distinguish specific sounds usually involve those made by a mother or other support person in the environment of a child.

Perceived associations may be based on sound qualities applied to different objects (e.g., sound volume, presence of harmonics, banging noises) that may help focus association(s) to a specific object in a user's environment. Thus, for example, even if a person has never seen or heard a real tiger, any loud and/or fearsome sound may evoke an association with an image of such a large creature (e.g., compared with images of other objects). Along similar lines, the pitch of a sound may provide additional cues toward object associations where, for example, higher pitches (and lesser volumes) are generally associated with smaller objects. Such sound quality assessments may, for example, allow a person to associate a particular sound with a never-seen-before musical instrument.

Sound associations are not limited to the specific sounds made by an object. For example, cognitively, there may be acoustic associations based on the sounds of words that define or describe an object, or letters or phonemes that make up those words. For example, among the English-language words "ball", "cat" and "door", associating a word that begins with the sound produced by a "B" or ends with a sound produced by a "T" is sufficient to identify one selection among the three candidates. An ability to mix together, break apart and change the sounds of words (i.e., phonological awareness) adds to an ability of a person to associate sounds with objects based on vocabulary and language.

Although sound symbolism (also known as sound-meaningfulness and phonetic symbolism) that suggests associations between sound sequences and meanings within spoken words is language-specific and considered controversial by some, the notion may allow some clustering of sound associations based on word pronunciations (e.g., the beginning of the words glitter, glacier, and glow all suggesting shiny objects).

Associations may not be limited to strict visual or acoustic properties produced by a handheld device. Cognitive and/or emotional associations may place different objects within specific or several different categories. These categories allow an object to be selected based on associations with other objects in the same or a similar category. For example, although a hand and a glove are two separate objects, they may readily be associated with each other. Categories or classifications may be based on how the object operates, its purpose or function, its product (i.e., if it produces something), objects that are typically used together, similar names, one or more aspects of appearance, one or more aspects of any sound(s) made by the object, structural similarities, plant or animal phyla, and so on.

The game of charades is an example of an activity that takes advantage of making such associations among (real or virtual) objects. Cognitive and/or emotional association may be based on a number of syllables in a word that describes the object, descriptive words that sound similar, a related object similar in appearance, mathematical relationships, musical pitches, objects that have similar functional uses, objects that are typically seen together, sounds that are typically heard together, and so on.

Within further examples, associations may be based on the timing and/or synchrony of visual, audible and/or haptic cues presented on the handheld device. Intervals between (i.e., controlling the rate of) presenting or changing cues may be dependent on movements of the handheld device (e.g., device orientation, rotational velocity of device movements). When a user determines that the timing of cues presented by the handheld device approximately matches and/or is in synchrony with at least one changing or dynamic (i.e., changing over time) attribute of a target or selected object producing one or more changing (e.g., visual, acoustic) attributes, then an indication may be made by the user of a perceived association with the selected object. As an example, if a device user views a number of (real or virtual) persons waving (e.g., in an effort to attract attention) at differing frequencies, then a particular individual may be selected by matching (as closely as desired) the frequency of waving with a rate of presenting IMU-dependent visual, audible and/or haptic cues on the handheld device.

During such associations based on timing or synchrony, there may be "mixing and matching" of the types of changing attributes produced by the handheld device versus those associated with two or more perceived objects from which a selection may be made. As an example, haptic stimuli may be delivered (and felt by a device user) at an IMU-dependent rate on the handheld device while listening to the beat of musical instruments. When a match in beat (i.e., rate of particular notes) and/or synchrony is perceived, then a selected instrument may be indicated (via the handheld device selection sensor) by the user. Similarly, a user may be controlling and listening to IMU-dependent acoustic broadcasts by the handheld device while observing motions of real or virtual objects in the user's environment to select an object based on rate and/or synchrony of the observed motions.

Within descriptions herein, any means that evokes an association perceived by a device user with a specific object in the environment of the user may be effective within methods to specify a selected object from a group of objects based on visual display(s) and/or acoustic sound(s) generated by the handheld device. Having a device user (i.e., not a machine) make such associations may broaden the range of associations possible and avoid deploying sophisticated programming strategies within the handheld device such as machine-learning. In order to make a unique selection, at least one visual and/or acoustic cue and/or the timing of such cues may be distinctive for each of the N objects under consideration by a user at a given time.

Optionally, within further examples, a processor may be aware of such distinctive cues or attributes, enabling presentation of only such distinctive cues or attributes on the handheld device. Alternatively, a range (e.g., continuous or large number of selections) or spectrum of IMU-dependent visual and/or acoustic cues may be available to the device user. In the latter case, a "closest match" between a visual or acoustic attribute generated on the handheld device and corresponding attributes of objects may be computed to determine a selected object.

As examples, a full color pallet (e.g., with millions of available colors) may be viewable on handheld device light sources or displays. Once a color or group (i.e., combination) of colors is selected, an object that contains a color or group of colors that is most similar to a selected color or group of colors may be determined (e.g., using the metric, $\Delta E$, as defined by the International Commission on Illumination). Alternatively, only the colors or group of colors used to make up (e.g., predefined) viewable objects may be presented on device displays.

Figure 3A:
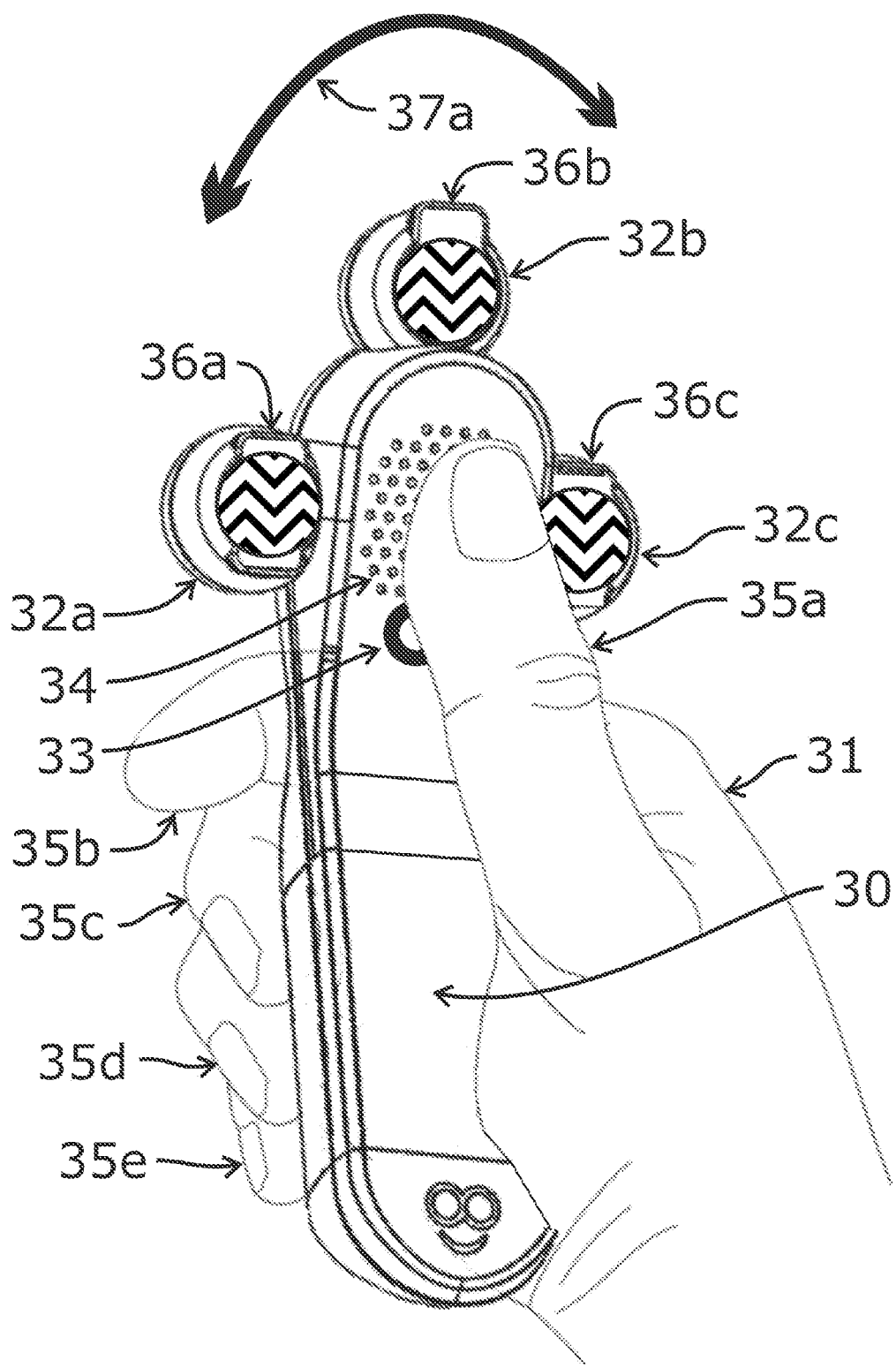
FIG. 3A follows on from the scenario within the left page shown in FIG. 1, in which the orientation of a zigzag pattern on the three displays of the handheld device (allowing selection of one of the four snowmen) is controlled by the vertical orientation of the handheld device (e.g., relative to IMU-based measurements of the gravitational pull of the earth).

Along similar lines, the orientation of a pattern may be selected using a high degree of fidelity (e.g., among at least dozens of perceptively different orientations), allowing a user to select from a large number objects containing patterns with perceptibly different pattern orientations (e.g., see FIGS. 1 and 3A). Alternatively, only predefined orientations used to make up viewable objects may be presented on device displays.

Within further examples, any handheld device components that may be manipulated by a user and "sensed" by a device processor may be used by the device user to indicate a selection. The indication of a selection may generally be thought of as a simple, binary indication when a perceived (i.e., by the device user) association occurs with a selected object, based on one or more visual and/or acoustic cues. User selection indications may be made using pushbuttons, touch sensors (e.g., measuring resistance), proximity sensors (e.g., measuring changes in electromagnetic induction or capacitance), scroll wheels, toggle switches, or any other sensed mechanism available on a handheld device that may be manipulated by a user.

Figure 2:
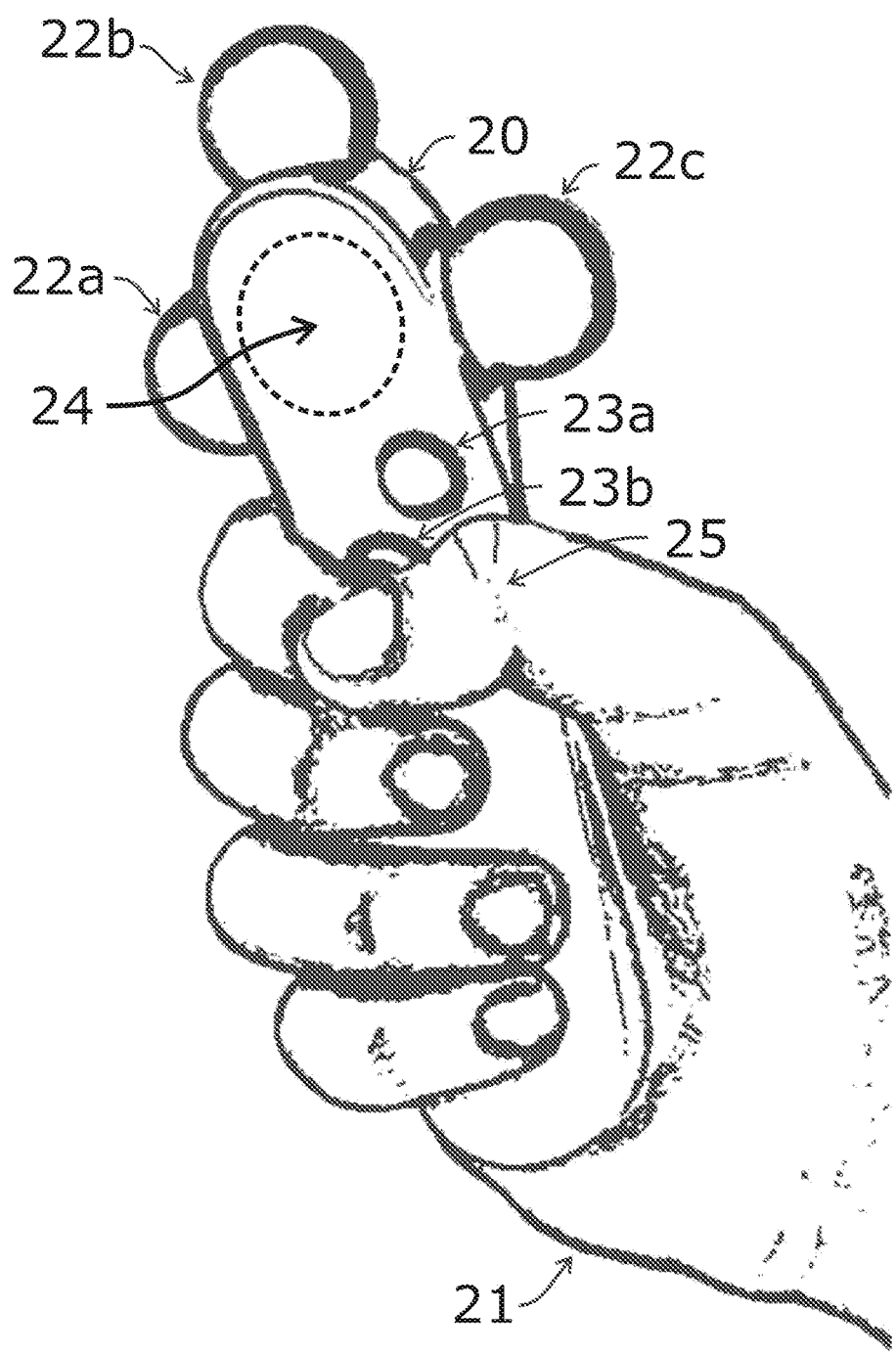
FIG. 2 shows a handheld device grasped by the hand of a young child that includes three spherical displays and two pushbutton switches used to make selections (where the thumb is moved slightly compared with normal use to reveal the switches).

As an aid to a user before making final selections, intermediate steps may optionally be included, for example, to eliminate one or more possible selections or initially narrow selections to one or more subsets of visual and/or acoustic cues. As illustrated in FIG. 2, a selection (i.e., a perceived association) may be indicated using a (momentary contact) pushbutton (e.g., at 23b). If one or more additional pushbuttons are available (e.g., at 23a), such pushbuttons may, for example, be used to indicate a desire by the device user to eliminate a cue or attribute (or group of cues) from the selection process (i.e., not to be re-presented) or to remember to return to a presented cue at some later time.

Alternatively, or in addition, the timing of button presses may be used to indicate different user intents such as selection versus elimination of a presented cue. For example, using just a single pushbutton, a single press may signify eliminating a cue (analogous to indicating "no") from the selection process (i.e., keeping the cue from being presented again on the handheld device). Within this scenario, a double press (e.g., two sequential presses within a time less than two seconds) may indicate selection of an object (analogous to indicating "yes").

In further examples, a microphone may be used to make selections (or to eliminate cues from the selection process) based on associations by a device user. Sounds or words may be recognized by a device processor to make such determinations. For example, the word "yes" may be recognized as identifying a selected object by the user. The word "no" may be used to eliminate a cue from further consideration, and the phrase "don't know" may be classified by a device processor to allow consideration of other visual or acoustic cues before returning to the visual or acoustic cue just presented (if needed). Recognized sounds may include words, phrases, utterances, phonetic sounds, musical notes, animal sounds, alert sounds, and so on.

In yet further examples of selection schemes, by processing IMU data streams, a "tap" or nudge of the handheld device may be identified as a result of intentionally moving and subsequently causing an object (i.e., a "striking object") to hit a location on the surface of a handheld device (i.e., "tap location") targeted by the user. A tap may be generated by the device user by one of tapping a holding hand digit onto the handheld device, tapping an opposing hand onto the handheld device, tapping an opposing hand digit onto the handheld device, tapping a human body part onto the handheld device, and tapping the handheld device onto a solid object. The striking object may also be a stylus, a stick, a pencil or other moveable object.

Within further examples, both the handheld device and another object (e.g., child's toy, another handheld device) may be moved simultaneously toward each other. In general, relative movements of the handheld device compared with the surface being tapped determine tap characteristics (e.g., peak force, accelerations, computed tap location) versus which object is moved (e.g., relative to the ground or other objects in the environment of a user). IMU data streams prior to and following the tap may help to determine whether a striking object was used to tap a stationary device, the device was forcefully moved toward another object, or both processes occurred simultaneously.

Differing user indications may be detected by identifying different tap locations and/or (particularly acceleration) forces on the handheld device (e.g., tapping a center display in FIG. 2 at 22b indicating "yes" versus tapping the main body of the handheld device to indicate "no"), tapping different objects (e.g., tapping with a relative "soft" surface finger to indicate "yes" while tapping the handheld device against a hard surface such as a desk to indicate "no"), and/or distinguishing different gesture movements (e.g., movements in a clockwise direction to indicate "yes" and movements in a counter-clockwise direction to indicate "no"). By determining gesture directions and/or tap modes (e.g., forceful versus light tap), different selection steps (e.g., "yes", "no", "don't know") may be indicated.

Within further examples, a shaking of the handheld device may be identified based on frequency components of device movement (e.g., measured using Fourier transformation techniques). Physiologically, shaking may be identified as containing frequencies up to about four Hertz (where higher than this range up to about twelve Hertz is generally considered a pathological tremor). Shaking the handheld device may be in any direction or alternatively, shake direction and/or orientation may be used to indicate user intent such as "yes", "no" or "don't know", as just described.

An advantage of using IMU data streams to identify selection steps is eliminating a need for a separate pushbutton or other sensing component (where an IMU is already used for control of visual and/or acoustic prompts). One method to combine both: 1) the control of visual and/or acoustic cues and 2) indicating user selections, involves gesture movements of the handheld device by the human in one or more directions that differ (e.g., not in the same plane or direction) from movements or rotational orientations used to control visual and/or acoustic cues.

Although the sensing of selection indications based on IMU data streams may eliminate a need for a pushbutton and/or other sensor, this does not imply a need to eliminate symbols, or contact points on the handheld device. Indeed, images of pushbuttons or any other symbols may be applied to (e.g., painted on) surfaces of the handheld device at different potential tap locations. For example, catering particularly to young children, different tap locations may be indicated by brightly colored circles (or other shapes) on the surface of the handheld device. Optionally, such symbols may be applied using temporary adhesives (i.e., including as so-called "stickers") that may be exchanged for different user applications or simply for fun as a child ages and/or develops different personal preferences.

Methods to determine the presence of a tap, tap characteristics (e.g., against a hard versus soft surface), and tap locations on the handheld device are further described in co-pending U.S. application Ser. No. 17/874,253 filed Jul. 26, 2022, the entire disclosure of which is expressly incorporated herein by reference.

Within additional examples, the time that a selection is made (i.e., indicating a perceived association by the device user) may be used as a further element of controlling actions on the handheld device and/or remote system(s). Selection time may be used to compute one or more intervals since one or more previous selections, or an interval since an event within the environment of the device user (e.g., a reaction time since the selected object was viewable and/or heard by the user). Such selection timing may be deliberate (i.e., where the device user intentionally times when one or more selections occur) or unforced (i.e., where a stimulus-response or selection interval may be measured by the device in a manner that is unknown to the user).

Selection times may also be compared to additional reference times in order to further modulate or control one or more actions. As an example, the time that a selection of a food item may be compared to typical meal times to determine whether the food item should be located, placed on a grocery list or ordered for delivery. As a further example, whether to initiate the playing of a selected game or educational experience (i.e., as a selected action) may depend on the time the selection was made relative to a usual bedtime for a young child.

Within yet further examples, aspects of a selected action resulting from the indication of an association with a selected object may depend on context within the interactive environment. Under some contexts, it may be advantageous to relax the conditions for performing selected actions or activities. For example, during educational testing, an action that includes a "reward" for the device user may be provided when an association is made to a correct answer as well as to an answer that is close to being correct. A relaxing of the perceived association and selection process may be referred to as "interpretive control" that may be useful within interactions involving the very young, the elderly, or those with reduced motor and/or cognitive functions.

Additionally, during activities that, for example, involve young children or individuals who are cognitively challenged, associations may involve significant degree of "guessing". Under such conditions, interpretive control may include forms of "nudging" (e.g., providing intermediary hints) toward one or more correct or target associations. For example, a young child may not fully understand how to manipulate a handheld device to attain the display of a specific a color. During such interactions, auditory instructions may accompany the color selection process (e.g., broadcasting "hold the wand straight up"), guiding the individual toward a selection. Similarly, a flashing display and/or repeating sound (where frequency may be related to how close a cue or attribute is to a particular selection) may be presented as a user approaches a selection (e.g., a correct answer). On the other hand, incorrect selections or a selection in which there is no apparent association (e.g., a color selection that appears not related to any object known to a device processor) may be accompanied by an "incorrect" indication (e.g., buzzing sound), or instructional broadcasts and/or displays. Further aspects of interpretive control are more fully described in U.S. Pat. No. 11,334,178, filed Aug. 6, 2021, and U.S. Pat. No. 11,409,359 filed Nov. 19, 2021, the entire disclosures of which are expressly incorporated herein by reference.

Along similar lines, selection processes may optionally include a dependence on the "context" of an interactive environment. Based on context, a subset of all perceived (real or virtual) objects in the environment of the device user may be considered during selection processes. Such object exclusions (along with their cues or attributes) may speed selection processes and/or contribute to more readily making desired selections. For example, if a device user is involved in the construction of a virtual object, selections made using the handheld device may be isolated to the tools and/or building components related to the construction project. During one or more construction activities, perceived objects in the environment of the device user that are not associated with the construction project may be excluded during selection processes, at least temporarily. Determining context from audiovisual content and subsequently generating control based on such contexts are more fully described in U.S. Pat. No. 11,366,997, filed Apr. 17, 2021, the entire disclosure of which is expressly incorporated herein by reference.

Additionally, the generation of visual and/or auditory attributes on the handheld device may take into account accessibility factors by some device users. For example, particular colors and/or color patterns may be avoided within visual cues when devices are used by individuals with different forms of color blindness. Similarly, if an individual has a hearing loss over one or more ranges of audio frequencies, then those frequencies may be avoided or boosted in intensity (e.g., depending on the type of hearing loss) within audio cues.

The handheld device may additionally include one or more of one or more photodiodes, an optical blood sensor, and an electrical heart sensor, each operatively coupled to the device processor. These additional components may provide additional options for user select and/or modulate actions or cues using the handheld device. In addition, a battery, providing power to the electronic components, may allow the handheld device to operate untethered from any other power source.

The handheld device may optionally include one or more cameras or other light sensors (e.g., scanners, bar code readers). Such one or more light sensors may be used to determine one or more visual attributes of perceived objects in the environment of the handheld device user during a selection process. As an example, a camera may determine distinctive colors of drawn objects within viewable pages of a book. Such colors may then be used as a basis for selecting from the objects within the viewable pages based on perceived color matching. As a further example, a camera or QR code reader may be used to identify a selection of objects displayed on a screen. An individual object may subsequently be selected based on a unique visual and/or acoustic attribute of the identified objects (e.g., with known visual or acoustic characteristics or attributes based on the one or more QR codes).

The handheld device may also optionally include one or more microphones that, similar to light-based sensors just described, may be used to identify acoustic cues of objects in the environment of the handheld device user. As an example, a microphone may identify repetitive sounds from different objects (e.g., different birds chirping). An individual bird may subsequently be selected based on a selecting a rate (e.g., based on haptic stimulation by the handheld device) that matches or synchronizes with chirping perceived by the device user.

The physical location of a handheld device as well as its orientation in (three-dimensional) space may be further determined by camera-based tracking of the handheld controller during at least some times when in use such as when visible to one or more cameras (i.e., where such cameras are not a component of the handheld device). Camera-based measures of handheld controller position (e.g., orientation in the field-of-view of the camera including relative to other objects in the field-of-view, velocity, acceleration) may be combined with IMU-based data streams to provide further initiation and/or modulation of resultant actions. Systems and methods to determine such camera-based measures are described in U.S. Pat. No. 11,334,178, filed Aug. 6, 2021 and U.S. Pat. No. 11,409,359, filed Nov. 19, 2021, the entire disclosures of which are expressly incorporated herein by reference.

Within additional examples, although not "handheld" in a strict sense, such portable electronic devices may be affixed and/or manipulated by other parts of the human body. A device in which perceived associations are made based on IMU-dependent visual and/or acoustic presentations may, for example, be affixed to an arm, leg, foot or head. Such positioning may be used to address accessibility issues for individuals with restricted upper limb and/or hand movement, individuals absent a hand, and/or during situations where a hand may be required for other activities.

During some situations such as when N (i.e., the number of perceived objects) is large, it may not be practical or physiologically feasible to distinguish a sufficient number of visual or acoustic attributes to select from a group of N objects in one step. For example, if associations are based on object color(s) within a book contains dozens of pages and where each pages contains dozens of objects, then it may not be economically feasible to print such a book with up to thousands of distinct object colors or to have a device user make subtle distinctions among such a large number of color selections (particularly if including accommodations for color blindness). Even within a single page, selecting a single state or province from a map containing fifty or more distinctly color-coded states or provinces would be difficult for many device users.

As N becomes large, it may be advantageous to layer the selection process using attributes generated on the handheld device, where such layered selection-making may be expressed or visualized in the form of a so-called "decision or selection tree". For example, if a book contains a large number of pages, then a device user may initially select a chapter within the book (e.g., by displaying chapter number or broadcasting the titles of chapters using a handheld device speaker). The next (decision or selection tree) layer may be to select a page within the selected chapter (again, either by visual or acoustic association), followed by a selection process for specific objects displayed on a selected page. Selection of a color-coded state or province within a map may entail dividing the map into regions (and even further into sub regions) before selecting a specific state or province.

Using such a decision-tree approach, the total number of possible selections is the (multiplicative) product of the number of possible selections of each layer. Different layers or stages within the decision-tree process may use visual attributes, acoustic attributes or both simultaneously. There is no dependence on association modes (e.g., visual, acoustic, categories of objects) used within any layer or stage of the process with any other selection stage. In other words, there is freedom to "mix-and-match" the types of associations made by a device user at any time during such a decision-tree selection process.

Within further examples, it is even possible to generate multiple (visual and/or acoustic) attributes during a single selection step. For example, if a user hesitates in producing additional visual or acoustic cures, or in making a selection (e.g., for a period greater than about a few seconds), aspects of the attribute may be repeated, changed (e.g., made brighter, made louder), and/or a different type or representation of an attribute may be displayed or broadcast (e.g., a different representation of an object category, different name). The repeating of cues or attributes, including utilizing different forms, may be performed any number of times, particularly following prolonged hesitation by a user.

FIG. 1 shows two pages within a book or magazine 10, where each of the two pages Ila, 11b contain objects 12a, 12b, 12c, 12d, 13a, 13b, 13c, 13d with distinctive visual attributes. Perceived associations between visual and/or acoustic attributes and distinctive images displayed on book pages may be selected using a handheld device (not shown).

On the left page 11a of the book 10, the visual orientation of a zigzag pattern on the buttons 14a, 14b, 15a, 15b, 16a, 16b, 17a, 17b of the four snowmen 12a, 12b, 12c, 12d distinguish the snowmen from each other. For example, the zigzag pattern is horizontal (i.e., relative to the typical orientation while reading the book) within the pair of buttons 16a, 16b on the snowman at 12c on the lower left of page at 11a. The horizontal pattern 16a, 16b is distinctive from all other buttons 14a, 14b, 15a, 15b, 17a, 17b.

Within the right page 11b of the book 10, each of the images 13a, 13b, 13c, 13d depicts a different type of animal (i.e., bird at 13a, cat a 13b, bear at 13c and cow at 13d). Thus, for example, an image and/or sound of a bear produced by a handheld device (not shown), would be perceived by most individuals as associated with the cartoon-like image at 13c depicting a bear on the lower left side of the book page at 11b.

FIG. 2 shows a handheld device 20 grasped by the right hand 21 of a young child. The handheld device 20 includes three spherical display components 22a, 22b, 22c, two pushbuttons 23a, 23b and an embedded speaker, e.g., just inside the skin of the device in the region outlined by a dashed-line ellipse 24. The thumb 25 of the child's hand 21 is moved slightly compared with normal use to reveal two device pushbuttons 23a, 23b. Visual cues or attributes that may be associated with a selectable object in the vicinity of the device user may be displayed on any or all of the device displays at 22a, 22b, 22c and/or acoustic cues may be broadcast using the device speaker at 24.

FIG. 3A follows on from the scenario depicted within the left page of the book in FIG. 1, in which the orientation of a zigzag pattern on pairs of buttons (14a, 14b, 15a, 15b, 16a, 16b, 17a, 17b in FIG. 1) within each of four snowmen (12a, 12b, 12c, 12d in FIG. 1) is a visual feature that distinguishes individual snowman from each other (and other objects within the pages shown). FIG. 3A shows a handheld device 30 being cradled between a thumb 35a and fingers 35b, 35c, 35d, 35e of a right hand 31 of a device user. The thumb may also be used to operate a (momentary contact) pushbutton at 33 to indicate selections by the device user.

In this selection example, zigzag patterns 36a, 36b, 36c are displayed on each of the three spherical displays 32a, 32b, 32c of the handheld device 30. In FIG. 3A, the handheld device 30 is shown oriented vertically and may subsequently be rotated 37a by the device user in a manner analogous to rotating a hand of a clock on a wall (i.e., in a frontal plane) to control rotational orientation of the displayed zigzag patterns 36a, 36b, 36c. IMU-based data streams allow determination of the direction (i.e., in three-dimensional space) of the gravitational pull of the earth that, in turn, allows handheld device orientation to be computed. Optionally during this time, the handheld device may additionally produce acoustic cues or attributes via the device speaker 34 as the handheld device is rotated 37a.

Once the device user perceives that the zigzag pattern on the device displays 36a, 36b, 36c match (at least approximately) the zigzag pattern of a pair of the buttons on a selected snowman (i.e., the snowman at 12C shown on the lower left of the page 11a in FIG. 1), an indication by the device user may be made using a thumb at 35a to press a pushbutton at 33 on the handheld device 30. This selection, along with a recorded time that the selection was made, may then be used to control subsequent actions or activities with the handheld device 30 and/or transmitted to other devices (not shown) to control or modulate additional or alternative actions.

Figure 3B:
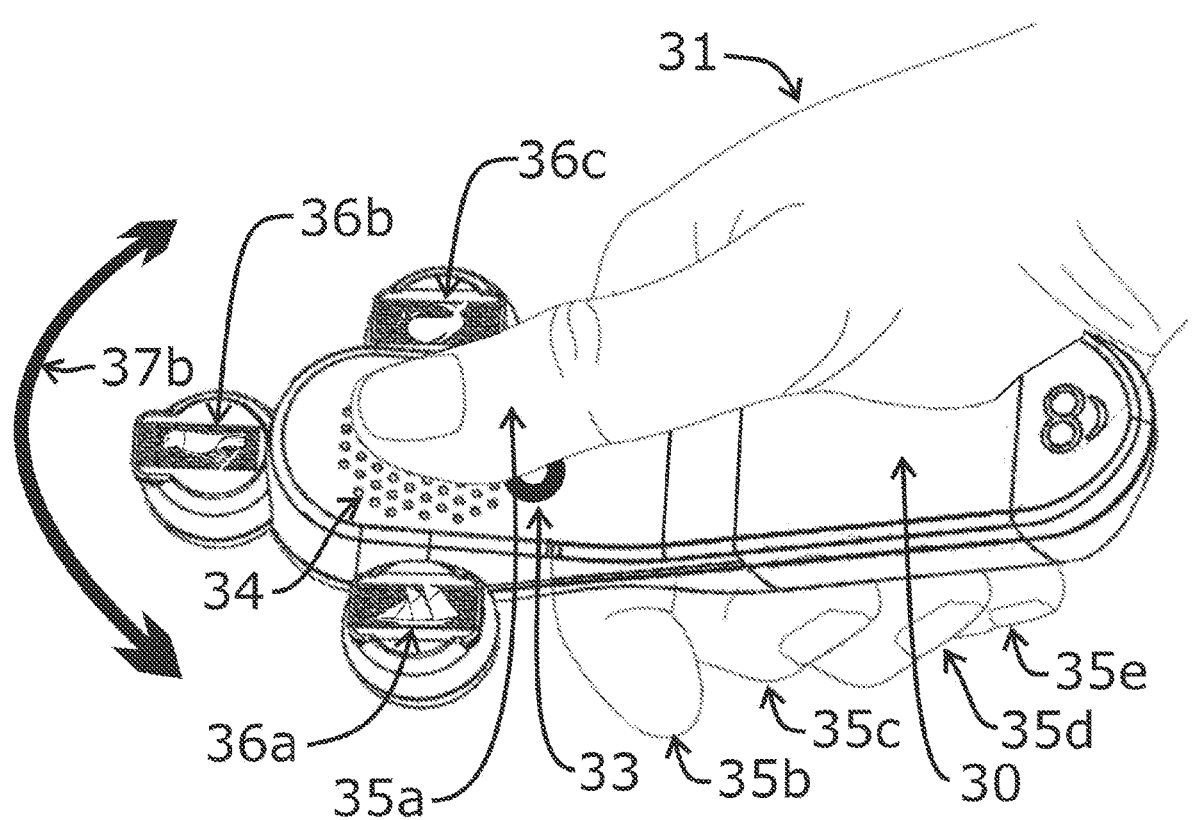
FIG. 3B illustrates images on three handheld device displays associated with different object categories controlled by a horizontal orientation of the device (e.g., relative to magnetometer-based measurements of the earth's magnetic field), allowing selection of a bird (i.e., as an animal category) from the group of objects shown on the right page in FIG. 1.

FIG. 3B follows on from the scenario depicted within the left page of the book or magazine in FIG. 1, in which images representing a bird at 13a, cat at 13b, bear at 13c and cow at 13d are displayed. The handheld device 30 is cradled between the thumb 35a and fingers 35b, 35d, 35e of the right hand 31 of a device user. By rotating and/or moving the handheld device in a horizontal plane (i.e., parallel to the surface of the earth 37b), different classes of objects may be shown on device displays 36a, 36b, 36c. Rotational orientation may be determined based on a magnetometer data stream gathered from an IMU embedded within the handheld device 30 where orientation may be determined relative to the magnetic pull of the earth. Alternatively, or in addition, translational movements (e.g., in the horizontal plane) may be sensed by one or more IMU accelerometers to view different objects and/or categories of objects on the displays 36a, 36b, 36c of the handheld device 30 as the device is moved about.

In these exemplary cases, a category of objects may be selected using the thumb at 35a of the hand 31 controlling the handheld device 30 to push a pushbutton at 33 when there is a perceived association by the device user between the image category displayed on the central display at 36b of the device 30 and the selected object category. For example, a press of the pushbutton at 33 as shown in FIG. 3B indicates the selection of a bird or general category of birds (e.g., corresponding to the upper-left object at 13a on the right page 11b of the book 10 illustrated in FIG. 1).

Upon rotating clockwise (i.e., looking down on the device from the perspective shown in FIG. 3B) and/or moving the device translationally to the right, a new image appears on the right display at 36c, the right display image (i.e., an image of a whale) moves to the center display at 36b, and the center image (i.e., the image of a bird) moves to the left display at 36a. Conversely, moving handheld device 30 in a counter clockwise direction and/or moving the handheld device translationally to the left, a new image appears on the left display at 36a, the left display image (i.e., an image of a boat) moves to the center display at 36b, and the center image (i.e., the image of a bird) moves to the right display at 36a. In this example, different images appear on each device display, allowing a device user to "look ahead" (as well as to maintain a sense of relative object positions with a virtual space) to see objects in each direction during the process of bringing an object category to the central display at 36b as a part of the process to make an object or object category selection.

Figure 4:
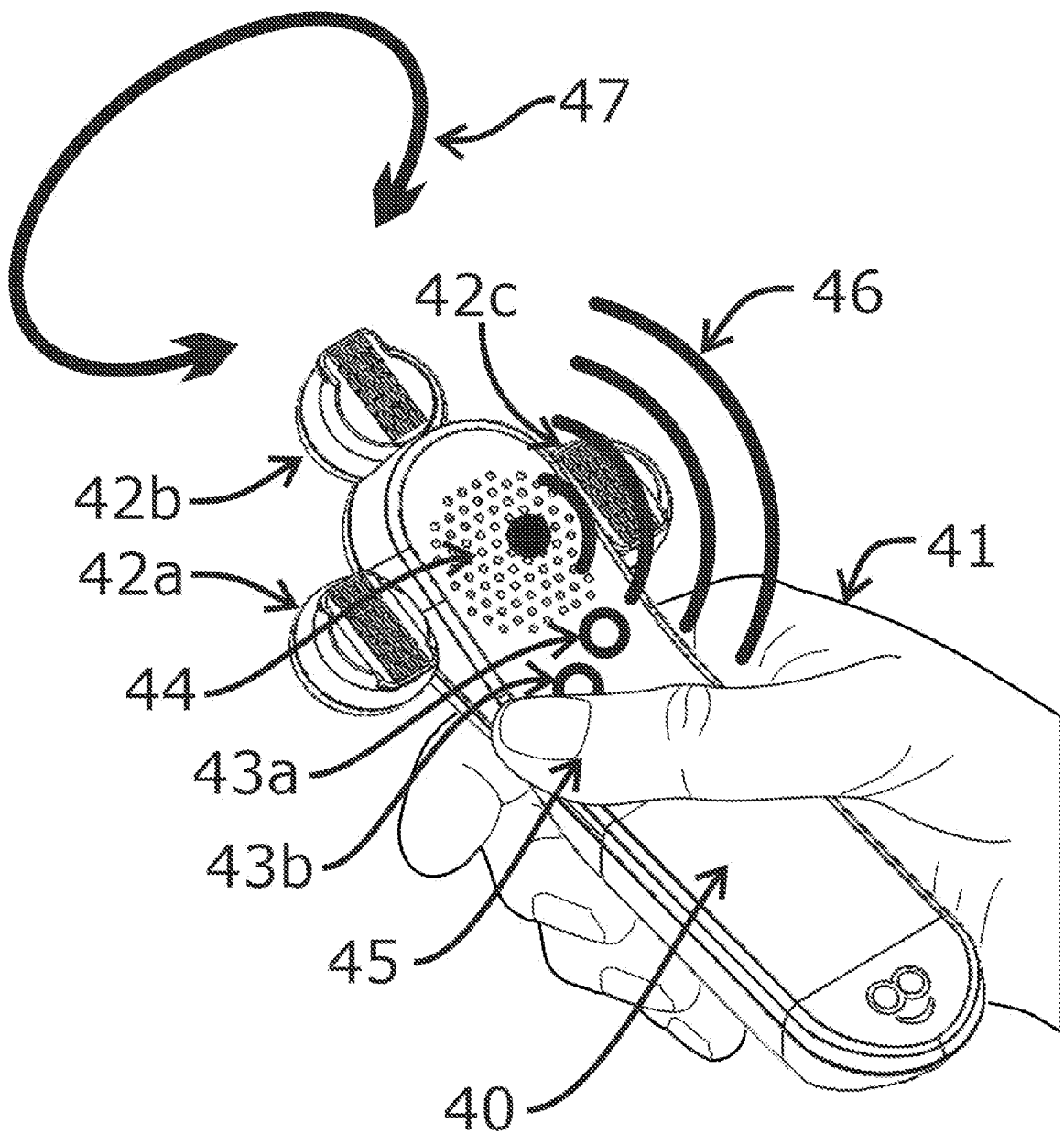
FIG. 4 illustrates the use of rotational orientation (e.g., manipulated primarily via a user's wrist) to control sounds generated on a handheld device speaker as a method to select an object based on perceived acoustic association(s).

FIG. 4 illustrates user-controlled broadcasting of different sounds on a handheld device speaker 44 as component of a process to indicate an acoustic association between sound(s) produced by the handheld device and one or more sounds associated with a selected object. As described in more detail above, associations with object sounds perceived by a device user may, for example, be based on sound(s) the object produces, sound(s) within words that describe the object, sound(s) produced by a category of objects that include the selected object, and so on.

Illustrating yet another means for handheld device control, in FIG. 4, rotation 47 of the handheld device 40 about its long axis may be used as a method to control the broadcasting of different sounds 46 on one or more speakers 44 of the handheld device 40 (e.g., controlling one or more rotational movements often referred to a pitch, roll and/or yaw). Cradled within the hand 41 of the device user, the device 40 may be rotated (i.e., altering roll), for example, by manual manipulation (particularly using the thumb 45) or by twisting particularly at the level of the wrist (not shown). One or more sounds generated on the handheld device speaker may be used as a means to select an object based on perceived acoustic association(s) by a device user. The broadcasting of different sounds 46 may optionally be accompanied by visual cues or attributes on device displays 42a, 42b, 42c.

As components of the handheld device 40 shown in FIG. 4, two (momentary contact) pushbutton switches 43a, 43b are available to the device user. One switch (e.g., at 43b) may, for example, be used to indicate a perceived association between a sound being broadcast by the device 46 and a selected object. When stepping through different sounds as the handheld device is rotated 47, the second pushbutton (e.g., at 43a) may, for example, be used to eliminate the sound(s) of possible selections. In other words, if the device user wishes to eliminate a sound from a repertoire of sounds (and perhaps replay a previously broadcast sound) a press of the second pushbutton (e.g., at 43a) may be used to indicate "no" or "not this one".

Along similar lines, other sensors (i.e., input components with respect to the handheld device 40) may be used to isolate and/or focus in on sounds perceived to associate with a selected object. For example, a microphone embedded within the handheld device (not visible in FIG. 4) may be used to control, select and/or eliminate different sounds (e.g., via device-based recognition of one or more distinct keywords or phrases). Optionally, when using a microphone, a pushbutton (e.g., at 43b) may be used to alert the device to "listen" (i.e., machine monitoring for identifiable keywords or sounds). The device may, for example, seek a match in the audio data stream for phrases such as "yes", "no", "not this one", and "save" (i.e., for re-review at a later time).

Figure 5:
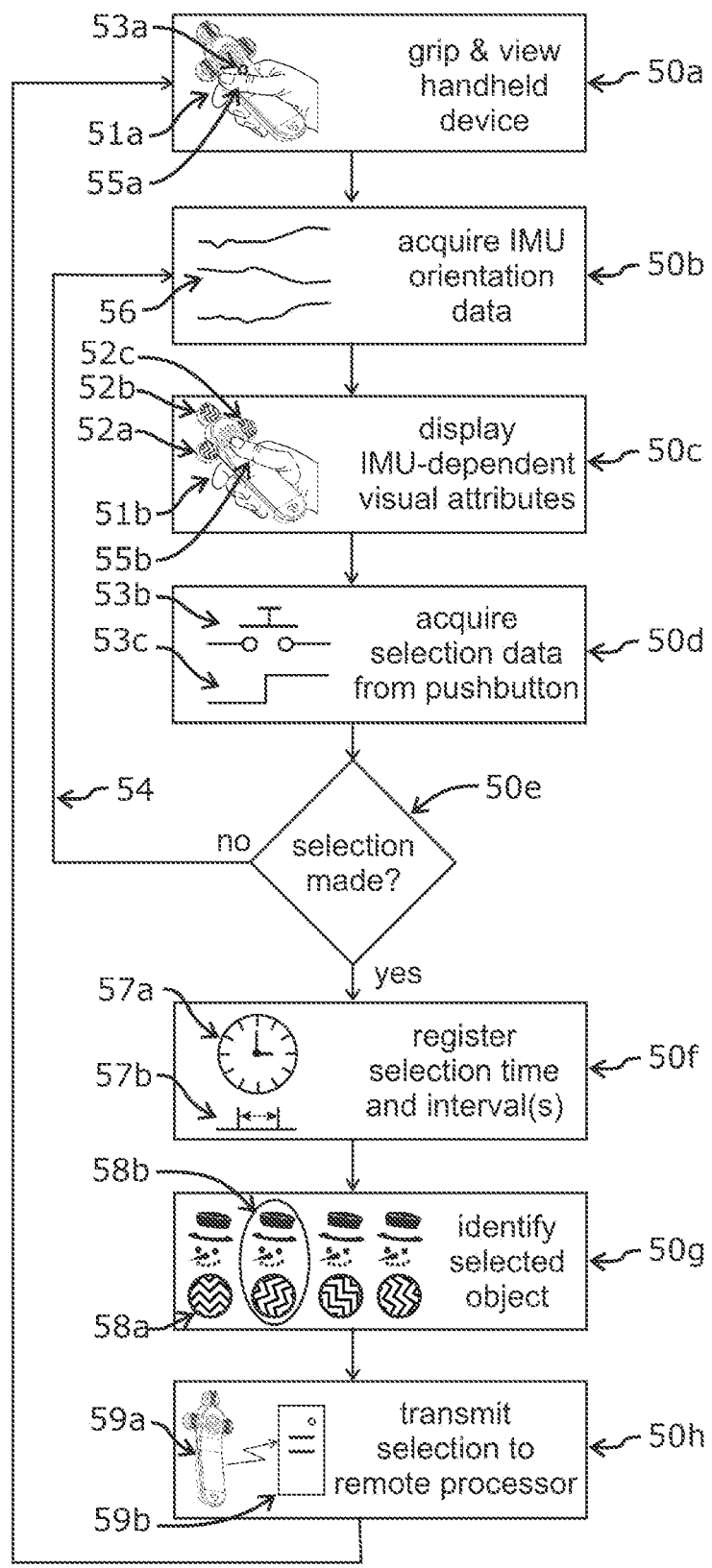
FIG. 5 is a flowchart outlining exemplary steps to: 1) generate visual cues or attributes on the handheld device based on device orientation, 2) indicate a perceived association between a displayed attribute and a selected object in proximity to the device user via a press of a pushbutton, and 3) transmit the identity of the selected object (i.e., snowman with an approximately vertical zigzag pattern on a button) to a remote processor.
Figure 6:
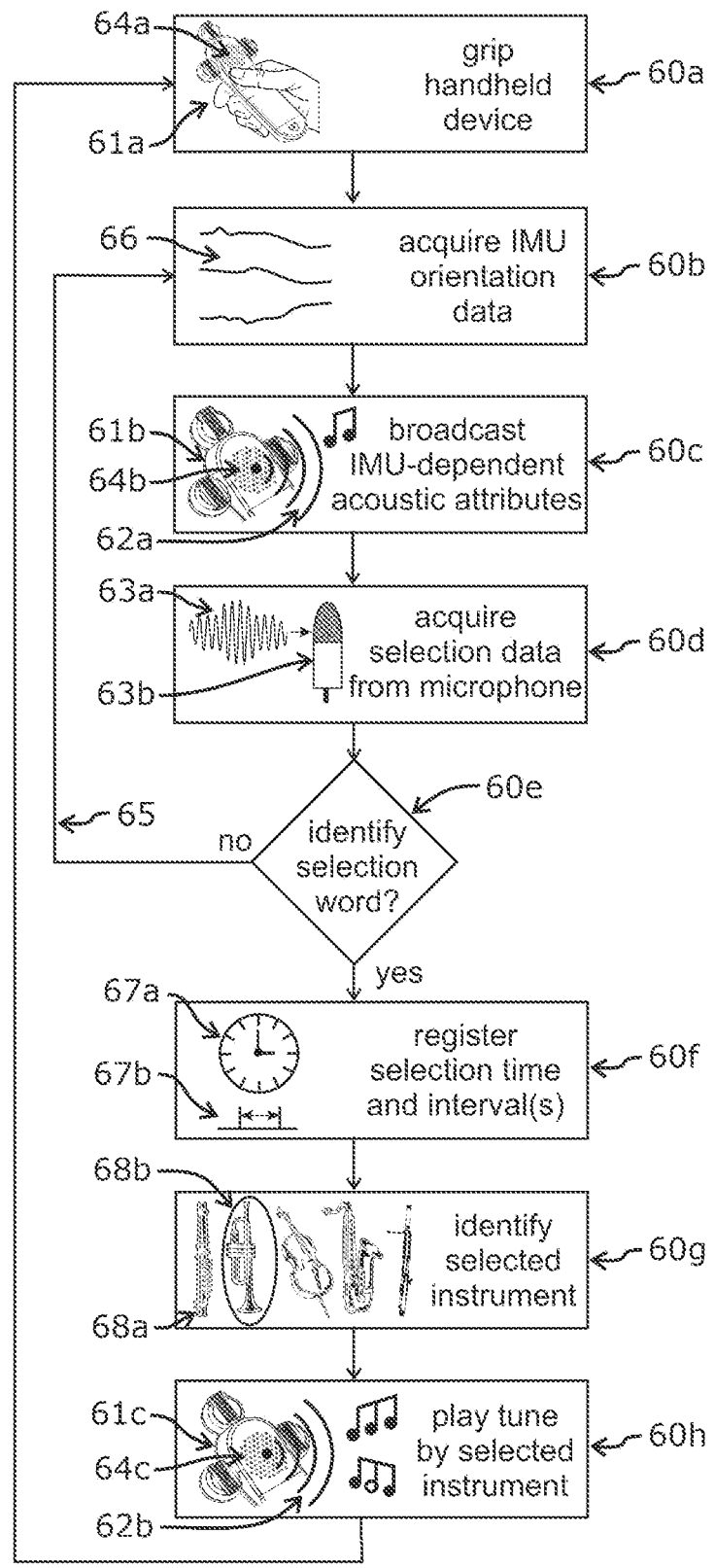
FIG. 6 is a flowchart outlining exemplary steps to: 1) generate acoustic cues or attributes based on device orientation, 2) select a musical instrument based on the broadcasting of a few notes on the handheld device speaker, and 3) play tunes on the handheld device that include the selected musical instrument.
Figure 7:
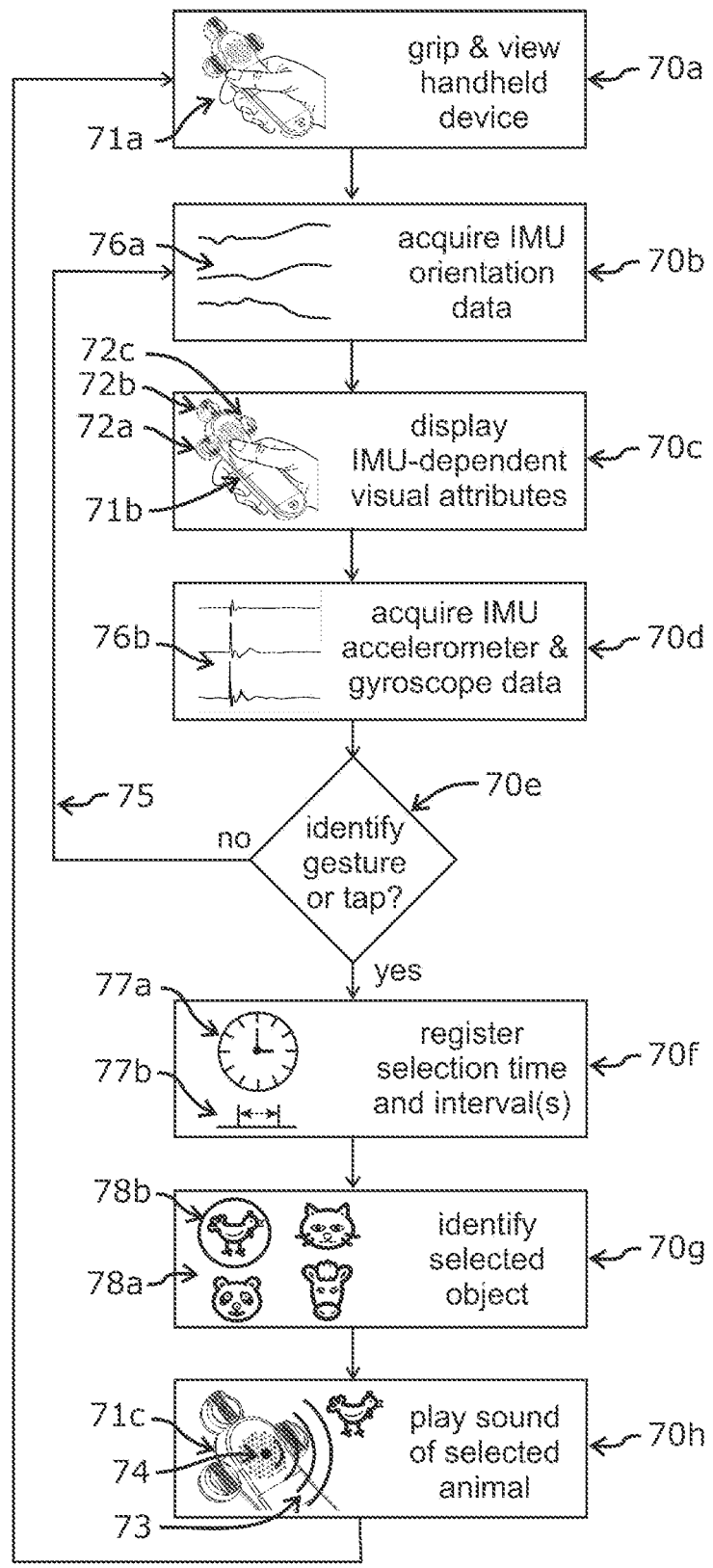
FIG. 7 is a flowchart outlining exemplary steps to: 1) view categories of animals on handheld device display(s) based on device orientation, 2) identify a selected animal category based on a tap or gesture using one or more IMUs within the handheld device to indicate perceived association(s) between a category and an animal in the environment of the device user, and 3) play sound(s) typically associated with the selected animal category (i.e., birds).

FIGS. 5, 6 and 7 are flowcharts outlining exemplary steps to select an action using a handheld device based on visual and/or acoustic associations made by the device user. From an overall perspective, different activities or actions may be achieved by "mixing and matching" key steps illustrated within these flowcharts. For example, visual (e.g., as in FIGS. 5 and 7), acoustic (e.g., as in FIG. 6) or both forms of stimuli may be used to form associations by the device user with an object in the environment of the user. Sensing by the handheld device to determine when the device user indicates a perceived association may be based on the states of pushbutton or contact switches (e.g., as in FIG. 5), words or other sounds recognized within data gathered by a handheld device microphone (e.g., as in FIG. 6), and/or the identification of a tap or gesture based on data gathered by one or more IMUs (e.g., as in FIG. 7) within the handheld device. An action performed as a result of a selection may be performed by the handheld device itself (e.g., as in FIGS. 6 and 7) or by a separate, connected device (e.g., as in FIG. 5). Actions may involve acoustic (e.g., as in FIGS. 6 and 7), visual and/or other forms of interaction such as haptic feedback, physical control of internet-of-things based objects (light switches, thermostat controls), and so on. Most combinations of such selection steps and resultant actions are possible.

FIG. 5 is a flowchart outlining strategies to indicate a perceived association between a displayed cue or attribute and a selected object in the environment of a device user via a pushbutton press 53b, and to transmit the identity of the selected object (and a time the object was selected) to a remote processor 59b. Steps in this exemplary process include:

1. at 50a, grip the handheld device 51a in a manner that allows the user to visualize device displays as well as to permit access to at least one selection pushbutton at 53a that may be depressed by a thumb 55a (or other digit) of the hand of the device user;
2. at 50b, acquire IMU data (typically in three orthogonal directions 56), e.g., based on the gravitational and/or magnetic pull of the earth, to compute the orientation and/or movements of the handheld device 51b;
3. at 50c, display visual attributes on device displays 52a, 52b, 52c that are dependent on handheld device 51b orientation (e.g., the rotational orientation of a zigzag pattern) and sense the depressing of a pushbutton by the thumb of the device user 55b to select an object based on the displayed visual attribute(s);
4. at 50d, determine the state of a selection pushbutton 53b and time(s) of any changes in state 53c;
5. at 50e, determine if a selection by the device user was enacted (via the pushbutton) and, if not, return at 54 to step 50b;
6. at 50f, register the time a selection by the device user was made 57a as well as any intervals 57b between the current selection time and previous selection times and/or events in the environment of the device user;
7. at 50g, from a group of objects in the (real or virtual) environment of the device user 58a, identify a selected object 58b that best matches the visual attribute(s) displayed (at step at the time the user selection was made;
8. at 50h, transmit from the handheld device 59a to one or more remote processors 59b the user selection and the time the user selection was made, allowing the remote system(s) to perform one or more actions based on the user selection and/or the time the selection was made.

FIG. 6 is a flowchart outlining processes to select a musical instrument based on the broadcasting of a few musical notes on the handheld device speaker 64a, and to subsequently play tunes that include the selected musical instrument 60h. Steps in this exemplary process include:

1. at 60a, grip the handheld device 61a in a manner that allows the user to hear sounds produced by the device speaker 64a;
2. at 60b, acquire IMU data (typically in three orthogonal directions 66), e.g., based on the gravitational and/or magnetic pull of the earth, to compute the orientation and/or movements of the handheld device 61b;
3. at 60c, broadcast musical notes (and/or other acoustic attributes) on the handheld device speaker 64b that are dependent on handheld device 61b IMU-measured orientation;
4. at 60d, using a microphone 63b, listen to sounds 63a in the environment of the handheld device to determine to determine the presence of an identified selection sound;

5. at 60e, determine if a selection (or keyword) sound has been identified within microphone data and, if not, return at 65 to step 60b;
6. at 60f, register the time a selection by the device user was made 67a as well as any intervals 67b between the current selection time and previous selection times and/or events in the environment of the device user;
7. at 60g, from a group of objects (e.g., flute, trumpet, violin, saxophone, bassoon) in the (real or virtual) environment of the device user 68a, identify a selected object 68b (e.g., trumpet) that best matches the acoustic attribute(s) broadcast (at step 60c) at the time the user selection was made;
8. at 60h, broadcast 62b on the one or more speakers 64c of the handheld device 61c, musical tunes that include the selected instrument 68b.

FIG. 7 is a flowchart outlining operations to identify a category of animals based on visual cues with a selection indicated by a tap or gesture of the handheld device, and to play sound(s) typically associated with the selected animal (i.e., birds). In this example, there is a mixing of visual cues with selected acoustic action(s). Steps in this exemplary process include:

1. at 70a, grip the handheld device 71a in a manner that allows the user to visualize device displays as well as to readily move the device about;
2. at 70b, acquire IMU data (typically in three orthogonal directions 76a), e.g., based on the gravitational and/or magnetic pull of the earth, to compute the orientation and/or movements of the handheld device 71b;
3. at 70c, display visual attributes comprising different categories of objects (e.g., boats, birds, whales) on device displays 72a, 72b, 72c that are dependent on handheld device 71b IMU-measured orientation;
4. at 70d, acquire additional IMU data 76b, particularly from accelerometers and gyroscopes, to determine the presence of a tap or gesture;
5. at 70e, determine if a recognizable tap or gesture is present within IMU data and, if not, return at 75 to step 70b;
6. at 70f, register the time a selection by the device user was made 77a as well as any intervals 77b between the current selection time and previous selection times and/or events in the environment of the device user;
7. at 70g, from a group of objects (e.g., bird, cat, bear, cow) in the real or virtual environment of the device user 78a, identify a selected object 78b that is perceived by the device user as being most closely associated with a selected object category (e.g., bird) displayed (at step 70c) at the time the user selection was made;
8. at 70h, broadcast sounds 73 on speaker 74 of the handheld device 71c that are typically produced by the selected object.

The foregoing disclosure of the examples has been presented for purposes of illustration and description. It is not intended to be exhaustive or to limit the invention to the precise forms disclosed. Many variations and modifications of the examples described herein will be apparent to one of ordinary skill in the art in light of the above disclosure. It will be appreciated that the various components and features described with the particular examples may be added, deleted, and/or substituted with the other examples, depending upon the intended use of the examples.

Further, in describing representative examples, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method for a human to select an action using a handheld device related to two or more perceived objects in proximity to the handheld device, each of the two or more perceived objects having at least one distinctive visual attribute, the method comprising:

providing a handheld device operated by the human that includes a device processor, at least one device display operatively coupled to the device processor, at least one inertial measurement unit operatively coupled to the device processor, and at least one selection sensor operatively coupled to the device processor;

acquiring, by the device processor from the at least one inertial measurement unit, one or more of accelerometer data, gyroscope data, gravitational orientation data and magnetic orientation data while the human is manipulating the handheld device to identify movement of the handheld device by the human;

displaying one of a plurality of displayed visual attributes on the at least one device display as the handheld device is manipulated by the human that is dependent on one or more of the accelerometer data, the gyroscope data, the gravitational orientation data and the magnetic orientation data;

acquiring, by the device processor from the at least one selection sensor, an indication by the human that a displayed visual attribute currently displayed on the at least one display is perceived by the human to be associated with a selected object of the two or more perceived objects; and performing the action, by one or both of the device processor and a remotely connected processor, based at least in part on one or both of the selected object and an indication time of the indication by the human, wherein the two or more perceived objects each comprises a displayed object within one of a book, a magazine, a poster, and a sticker.

2. The method of claim 1, wherein the two or more perceived objects each comprises one of a printed object within a book or a drawn object within a magazine.

3. The method of claim 1, wherein the at least one inertial measurement unit includes one or more of one or more accelerometers, one or more magnetometers, internal mass sensors and one or more gyroscopes.

4. The method of claim 1, wherein one or more of the accelerometer data, the gyroscope data, the gravitational orientation data and the magnetic orientation data each comprises measurements in directions orthogonal to each other.

5. The method of claim 1, wherein the displayed visual attribute comprises one or more of a displayed solid color, a displayed color combination, a displayed pattern, a displayed pattern orientation, a displayed texture, a displayed texture orientation, a displayed object shape, a displayed object size, a displayed category of objects, a displayed mathematical relationship, a displayed related object typically paired with the selected object, and one or more displayed characters included within a name of the selected object.

6. The method of claim 1, wherein the one or more selection sensors each comprises one of a pushbutton, a switch, a touch sensor, a proximity sensor, and a microphone.

7. The method of claim 1, wherein the one or more selection sensors comprise a microphone and wherein acquiring the indication comprises identifying a recognized sound made by the human identified within data acquired from the microphone by the device processor.

8. The method of claim 7, wherein the recognized sound comprises one or more of one or more words, one or more phrases, one or more utterances, one or more phonetic sounds, one or more musical notes, one or more animal sounds, and one or more alert sounds.

9. The method of claim 1, wherein the action is further based at least in part on one or both of an indication interval between the indication time and a previous time of a previous indication by the human, and an event interval between the indication time and an event time of an event in proximity to the human.

10. A method for a human to select an action using a handheld device related to two or more perceived objects in proximity to the handheld device, each of the two or more perceived objects having at least one distinctive visual attribute, the method comprising:
providing a handheld device operated by the human that includes a device processor, at least one device display operatively coupled to the device processor, at least one inertial measurement unit operatively coupled to the device processor, and at least one selection sensor operatively coupled to the device processor;
acquiring, by the device processor from the at least one inertial measurement unit, one or more of accelerometer data, gyroscope data, gravitational orientation data and magnetic orientation data while the human is manipulating the handheld device to identify movement of the handheld device by the human;
displaying one of a plurality of displayed visual attributes on the at least one device display as the handheld device is manipulated by the human that is dependent on one or more of the accelerometer data, the gyroscope data, the gravitational orientation data and the magnetic orientation data;
acquiring, by the device processor from the at least one selection sensor, an indication by the human that a displayed visual attribute currently displayed on the at least one display is perceived by the human to be associated with a selected object of the two or more perceived objects; and
performing the action, by one or both of the device processor and a remotely connected processor, based at least in part on one or both of the selected object and an indication time of the indication by the human,
wherein an additional action by one or both of the device processor and the remotely connected processor, based at least in part on one or both of an additional selected object and an additional indication time of an additional indication by the human, is performed by:
acquiring, by the device processor from the at least one inertial measurement unit, one or more of additional accelerometer data, additional gyroscope data, additional gravitational orientation data and additional magnetic orientation data;
displaying an additional displayed visual attribute on the at least one device display that is dependent on one or more of the additional accelerometer data, the additional gyroscope data, the additional gravitational orientation data and the additional magnetic orientation data; and
acquiring by the device processor from the at least one selection sensor, the additional indication by the human that the additional displayed visual attribute is perceived by the human to associate with the additional selected object of the two or more perceived objects.

11. The method of claim 1, wherein the device further comprises one or both of a Wi-Fi communications module and a Bluetooth communications module configured to communicate between the device processor and the remotely connected processor.

12. A method for a human to select an action using a handheld device related to two or more perceived objects in proximity to the handheld device, each of the two or more perceived objects having at least one distinctive acoustic attribute, the method comprising:
providing a handheld device operated by the human that includes a device processor, at least one speaker operatively coupled to the device processor, at least one inertial measurement unit operatively coupled to the device processor, and at least one selection sensor operatively coupled to the device processor;
acquiring, by the device processor from the at least one inertial measurement unit, one or more of accelerometer data, gyroscope data, gravitational orientation data and magnetic orientation data while the human is manipulating the handheld device to identify movement of the handheld device by the human;
broadcasting one of a plurality of acoustic attributes on the at least one speaker as the handheld device is manipulated by the human that is dependent on one or more of the accelerometer data, the gyroscope data, the gravitational orientation data and the magnetic orientation data;
acquiring, by the device processor from the at least one selection sensor, an indication by the human that an acoustic attribute currently broadcast by the at least one speaker is perceived by the human to be associated with a selected object of the two or more perceived objects; and
performing the action on one or both of the device processor and a remotely connected processor, based at least in part on one or both of the selected object and an indication time of the indication by the human,
wherein the two or more perceived objects each comprises a displayed object within one of a book, a magazine, a poster, and a sticker.

13. The method of claim 12, wherein the acoustic attribute comprises one or more of one or more words, one or more pronunciations of one or more letters within a name of the selected object, one or more elements of a spoken expression, one or more spoken mathematical relationships, one or more phonetic sounds, one or more object sounds typically produced by the selected object, one or more sound categories, one or more musical notes, alert sounds, and one or more animal sounds.

14. The method of claim 12, wherein the one or more selection sensors each comprises one of a pushbutton, a switch, a touch sensor, a proximity sensor, and a microphone.

15. The method of claim 12, wherein the one or more selection sensors comprise a microphone and wherein acquiring the indication comprises identifying a recognized sound made by the human identified within data acquired from the microphone by the device processor.

16. The method of claim 15, wherein the recognized sound comprises one or more of one or more words, one or more phrases, one or more utterances, one or more phonetic sounds, one or more musical notes, one or more animal sounds, and one or more alert sounds.

17. A method for a human to select an action using a handheld device related to two or more perceived objects in proximity to the handheld device, each of the two or more perceived objects having at least one distinctive visual attribute, the method comprising:
  providing a handheld device operated by the human that includes a device processor, at least one device display operatively coupled to the device processor, and at least one inertial measurement unit operatively coupled to the device processor;
  acquiring, by the device processor from the at least one inertial measurement unit, one or more of control accelerometer data, control gyroscope data, control gravitational orientation data and control magnetic orientation data while the human is manipulating the handheld device to identify movement of the handheld device by the human;
  displaying one of a plurality of displayed visual attributes on the at least one device display as the handheld device is manipulated by the human that is dependent on one or more of the control accelerometer data, the control gyroscope data, the control gravitational orientation data and the control magnetic orientation data;
  acquiring, by the device processor from the at least one inertial measurement unit, one or more of selection accelerometer data, selection gyroscope data, selection gravitational orientation data and selection magnetic orientation data;
  determining by the device processor from one or more of the selection accelerometer data, the selection gyroscope data, the selection gravitational orientation data and the selection magnetic orientation data more, one of a tap on the handheld device by the human and a gesture movement of the handheld device by the human, indicating that a displayed visual attribute currently displayed on the at least one device display is perceived by the human to be associated with a selected object of the two or more perceived objects; and
  performing the action on one or both of the device processor and a remotely connected processor, based at least in part on one or both of the selected object and an indication time of determining the selected object by the human,
  wherein the two or more perceived objects each comprises a displayed object within one of a book, a magazine, a poster, and a sticker.

18. The method of claim 17, wherein the gesture movement of the handheld device by the human comprises moving the handheld device in a gesture direction that differs from a visual attribute direction used to control the displayed visual attribute.

19. The method of claim 17, wherein the tap is generated by the human by one of tapping a holding hand digit onto the handheld device, tapping an opposing hand onto the handheld device, tapping an opposing hand digit onto the handheld device, tapping a human body part onto the handheld device, and tapping the handheld device onto a solid object.

20. A method for a human to select an action using a handheld device related to two or more perceived objects in proximity to the handheld device, each of the two or more perceived objects having at least one distinctive visual attribute, the method comprising:
  providing a handheld device operated by the human that includes a device processor, at least one device display operatively coupled to the device processor, and at least one inertial measurement unit operatively coupled to the device processor;
  acquiring, by the device processor from the at least one inertial measurement unit, one or more of control accelerometer data, control gyroscope data, control gravitational orientation data and control magnetic orientation data while the human is manipulating the handheld device to identify movement of the handheld device by the human;
  displaying one of a plurality of displayed visual attributes on the at least one device display as the handheld device is manipulated by the human that is dependent on one or more of the control accelerometer data, the control gyroscope data, the control gravitational orientation data and the control magnetic orientation data;
  acquiring, by the device processor from the at least one inertial measurement unit, one or more of selection accelerometer data, selection gyroscope data, selection gravitational orientation data and selection magnetic orientation data;
  determining by the device processor from one or more of the selection accelerometer data, the selection gyroscope data, the selection gravitational orientation data and the selection magnetic orientation data more, one of a tap on the handheld device by the human and a gesture movement of the handheld device by the human, indicating that a displayed visual attribute currently displayed on the at least one device display is perceived by the human to be associated with a selected object of the two or more perceived objects; and
  performing the action on one or both of the device processor and a remotely connected processor, based at least in part on one or both of the selected object and an indication time of determining the selected object by the human,
  wherein an additional action by one or both of the device processor and the remotely connected processor, based at least in part on one or both of an additional selected object and an additional indication time of determining the additional selected object by the human, is performed by:
  acquiring, by the device processor from the at least one inertial measurement unit, one or more of additional accelerometer data, additional gyroscope data, additional gravitational orientation data and additional magnetic orientation data;
  displaying an additional displayed visual attribute on the at least one device display that is dependent on one or more of the additional accelerometer data, the additional gyroscope data, the additional gravitational orientation data and the additional magnetic orientation data;
  acquiring, by the device processor from the at least one inertial measurement unit, one or more of selection accelerometer data, selection gyroscope data, selection gravitational orientation data and selection magnetic orientation data; and determining by the device processor from one or more of the selection accelerometer data, the selection gyroscope data, the selection gravitational orientation data and the selection magnetic orientation data, one of an additional tap on the handheld device by the human and an additional gesture movement of the handheld device by the human, indicating that the displayed visual attribute is perceived by the human to associate with the additional selected object of the two or more perceived objects.

21. A method for a human to select an action using a handheld device related to two or more perceived objects in proximity to the human, each of the two or more perceived objects having at least one distinctive visual attribute, the method comprising:

gripping, by the human, a handheld device that includes a device processor, at least one device display operatively coupled to the device processor, at least one inertial measurement unit operatively coupled to the device processor, and at least one selection sensor operatively coupled to the device processor;

manipulating, by the human, the handheld device, whereupon the device processor:

acquires movement data from the at least one inertial measurement unit related to movement of the handheld device; and displays one of a plurality of displayed visual attributes on the at least one device display that is dependent on the movement data;

activating the at least one selection sensor, by the human, whereupon the device processor identifies an indication by the human that the displayed visual attribute currently displaced on the at least one device display is perceived by the human as being associated with a selected object of the two or more perceived objects; and whereupon the action is performed, by one or both of the device processor and a remotely connected processor, based at least in part on one or both of the selected object and an indication time of the indication by the human, wherein the two or more perceived objects each comprises a displayed object within one of a book, a magazine, a poster, and a sticker.

22. The method of claim 21, wherein the two or more perceived objects each comprises one of a printed object within a book or a drawn object within a magazine.

* * * * *